US011386467B2

(12) United States Patent
Borchetta et al.

(10) Patent No.: US 11,386,467 B2
(45) Date of Patent: Jul. 12, 2022

(54) SYSTEMS AND METHODS FOR GENERATING CUSTOMIZED AVATARS AND CUSTOMIZED ONLINE PORTALS

(71) Applicant: Funderworks, LLC, Stamford, CT (US)

(72) Inventors: Michael Borchetta, Stamford, CT (US); Michael Frank, New Canaan, CT (US); Michael Donnarumma, Quogue, NY (US); Karen Phillips, Falmouth, ME (US)

(73) Assignee: Funderworks, LLC, Stamford, CT (US)

( * ) Notice: Subject to any disclaimer, the term of this patent is extended or adjusted under 35 U.S.C. 154(b) by 732 days.

(21) Appl. No.: 16/286,059

(22) Filed: Feb. 26, 2019

(65) Prior Publication Data
US 2019/0197590 A1 Jun. 27, 2019

Related U.S. Application Data

(63) Continuation of application No. 15/356,531, filed on Nov. 18, 2016, now Pat. No. 10,275,807, which is a continuation-in-part of application No. 14/304,930, filed on Jun. 14, 2014, now abandoned.

(60) Provisional application No. 61/834,918, filed on Jun. 14, 2013.

(51) Int. Cl.
| G06Q 30/02 | (2012.01) |
| H04L 67/02 | (2022.01) |
| H04L 67/306 | (2022.01) |
| H04L 67/53 | (2022.01) |
| H04L 67/131 | (2022.01) |
| A63F 13/63 | (2014.01) |

(52) U.S. Cl.
CPC ..... *G06Q 30/0279* (2013.01); *G06Q 30/0222* (2013.01); *G06Q 30/0269* (2013.01); *H04L 67/02* (2013.01); *H04L 67/131* (2022.05); *H04L 67/306* (2013.01); *H04L 67/53* (2022.05); *A63F 13/63* (2014.09); *A63F 2300/5553* (2013.01)

(58) Field of Classification Search
USPC .............................................. 705/319, 14.23
See application file for complete search history.

(56) References Cited

U.S. PATENT DOCUMENTS

| 7,162,429 B1 * | 1/2007 | Delgado ................ G06Q 30/02 726/28 |
| 7,822,687 B2 | 10/2010 | Brillon et al. |
| 8,130,219 B2 | 3/2012 | Fleury et al. |

(Continued)

OTHER PUBLICATIONS

Method and System for Displaying Contextual Information to an Avatar Based on a Profile of the Avatar in a Virtual World (Year: 2010).*

(Continued)

*Primary Examiner* — Gautam Ubale

(74) *Attorney, Agent, or Firm* — RowanTree Law Group, PLLC; Magdalena M. Fincham

(57) ABSTRACT

In accordance with some embodiments, a system facilitates the generation of a customized fundraising campaign on behalf of a third party organization by providing mechanisms via which an organizer of the third party organization can set terms of the fundraising campaign and allow participants of the campaign to create customized avatars for use in promoting the campaign.

25 Claims, 15 Drawing Sheets

(56) References Cited

U.S. PATENT DOCUMENTS

| | | | |
|---|---|---|---|
| 8,156,060 B2 | 4/2012 | Borzestowski | |
| 8,692,830 B2 | 4/2014 | Nelson et al. | |
| 8,727,787 B2 | 5/2014 | Castineiras | |
| 8,818,883 B2 | 8/2014 | Lawrence et al. | |
| 9,165,083 B2 | 10/2015 | Buehler et al. | |
| 9,576,400 B2 | 2/2017 | van Os | |
| 2002/0069108 A1 | 6/2002 | Aubertin | |
| 2004/0143520 A1* | 7/2004 | Barnum | G06Q 30/0236 705/30 |
| 2005/0248574 A1 | 11/2005 | Ashtekar | |
| 2006/0294465 A1 | 12/2006 | Ronen | |
| 2007/0171091 A1 | 7/2007 | Nisenboim | |
| 2007/0260984 A1 | 11/2007 | Marks | |
| 2009/0144639 A1 | 6/2009 | Nims | |
| 2009/0177545 A1 | 7/2009 | Castineiras | |
| 2009/0254859 A1 | 10/2009 | Arrasvuori | |
| 2010/0023413 A1 | 1/2010 | Castineiras | |
| 2010/0115022 A1 | 5/2010 | Rapo | |
| 2010/0306099 A1* | 12/2010 | Hirson | G06Q 40/025 455/414.1 |
| 2011/0244952 A1* | 10/2011 | Schueller | G07F 17/3262 463/31 |
| 2011/0300926 A1 | 12/2011 | Englman | |
| 2012/0158521 A1 | 6/2012 | McCullen | |
| 2012/0259773 A1 | 10/2012 | Hoffman | |
| 2012/0310761 A1* | 12/2012 | Flynn | G06Q 30/06 705/26.1 |
| 2015/0262262 A1* | 9/2015 | Carvajal | G06Q 30/0279 705/26.1 |
| 2017/0293941 A1* | 10/2017 | Acken | G06F 30/20 |

OTHER PUBLICATIONS

Web Artificial Intelligence Application (WAIP): Evolving, Personalizable, Web-based, Artificial Intelligence Companion (Year: 2009).*
Classification of Commercial and Personal Profiles on MySpace (Year: 2011).*
EasyMall—An Interactive Virtual Shopping System (Year: 2008).*
A_Personalized_Assistant_in_3D_Virtual_Shopping_Environment (Year: 2010).*
Monetization_and_Services_on_a_Real_Online_Social_Network_Using_Social_Network_Analysis (Year: 2013).*
GAO (QSP) Online System, Sep. 3, 2013 (For school 2013-2014 school year); 31 pps.
American Publishers Parents and Participants Portal; www.aphearst.com; Aug. 1, 2013; 17 pps.
Boy Scouts (Trail's End) Online Popcorn Site; Sep. 2013; 25 pps.
Office Action for U.S. Appl. No. 15/356,531 dated Mar. 9, 2017; 22 pps.
Final Office Action for U.S. Appl. No. 15/356,531 dated Sep. 21, 2017; 29 pps.
Office Action for U.S. Appl. No. 15/356,531 dated Mar. 12, 2018; 23 pps.
Notice of Allowance for U.S. Appl. No. 15/356,531 dated Jan. 24, 2019; 8 pps.
Office Action for U.S. Appl. No. 14/304,930 dated Mar. 10, 2017; 18 pps.
Final Office Action for U.S. Appl. No. 14/304,930 dated Dec. 12, 2017; 23 pps.

* cited by examiner

| USER ACCOUNT DATA RECORD | 302A |
|---|---|
| USER ID: U23457-98-768594 | 304A |
| CAMPAIGN IDENTIFIER(S): C-65748; C-47362; C-93746 | 306A |
| LOGIN CREDENTIALS: KathyB; ***** | 308A |
| AVATAR ID: AV-783920 | 310A |

| USER CAMPAIGN STATUS DATA RECORD | | | |
|---|---|---|---|
| USER ID: U23457-98-768594 | | | 302B |
| CAMPAIGN ID: C-93746 | | | 304B |
| AVATAR ID: AV-783920 | 306B | CAMPAIGN AVATAR DATA: dhsj/djkerk.djd | 308B |
| CUSTOM PORTAL URL: chsj/dherd/fhjd.org | 310B | AVATAR LOCATION DATA: skeidj/djjrj.hdy | 312B |
| CAMPAIGN STATUS: ACTIVE | 314B | SALES GOAL/CURRENT: $500/$260 | 316B |
| GROUP ID: G-4637 | 318B | GROUP IMAGE ID: GI-48473 | 320B |
| AWARD A STATUS: Y | 322B | AWARD B STATUS: N | 324B |
| MESSAGE ID: M-4643829 | 326B | PERSONAL VIDEO ID: V12-374636 | 328B |
| RECIPIENT ID(s): R8392065; R382755; R3839084; R37283940 | 330B | CUSTOM PORTAL LOGIN CREDENTIALS: KathyB; ****** | 332B |
| ASSOCIATED USER(S): U36458-98-3918374; U7564-98-029374; U3625-98-276354 | | | 334B |

*FIG. 3B*

SYSTEMS AND METHODS FOR GENERATING CUSTOMIZED AVATARS AND CUSTOMIZED ONLINE PORTALS

This application is a Continuation of U.S. patent application Ser. No. 15/356,531, filed on Nov. 18, 2016 in the name of Borchetta et al. and titled SYSTEMS AND METHODS FOR GENERATING CUSTOMIZED AVATARS AND CUSTOMIZED ONLINE PORTALS, which Application is a Continuation-In-Part Application of U.S. application Ser. No. 14/304,930, filed on Jun. 14, 2014 in the name of Borchetta et al. and titled SYSTEMS AND METHODS FOR FACILITATING FUNDRAISING CAMPAIGNS VIA USE OF CUSTOMIZED AVATARS, which application in turn claims the benefit of U.S. Provisional Application No. 61/834,918 filed Jun. 14, 2013 in the name of Borchetta et al., titled SYSTEMS AND METHODS FOR A CUSTOMIZED WEB SITE PORTAL TO FACILITATE FUNDRAISING. The entirety of each of these Applications is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION(S)

Embodiments described herein relate to systems, methods and articles of manufacture for facilitating a fundraising or awareness campaign to benefit a third party organization by use of avatars created to represent members or supporters of the third party organization.

BRIEF DESCRIPTION OF THE FIGURES

Features, aspects and advantages of various embodiments are described in detail below with reference to the accompanying drawings, which are intended to illustrate and not to limit the embodiments. The drawings comprise the following figures in which:

FIG. 3 comprises an example table storing data useful in a system according to one or more embodiments described herein.

DETAILED DESCRIPTION

Figure 1:
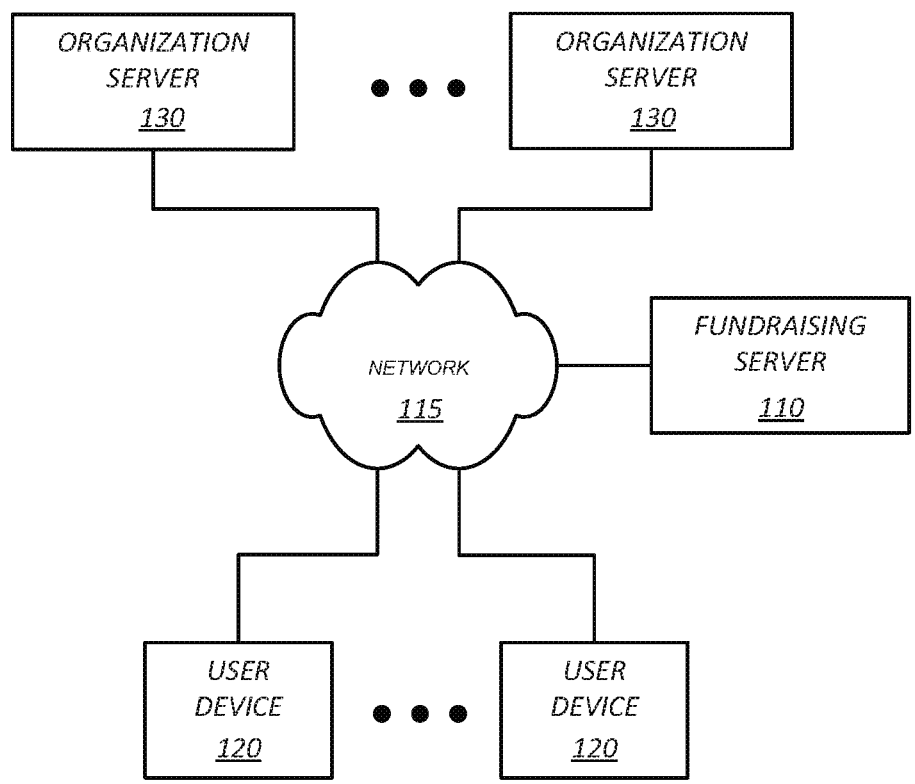
FIG. 1 is a schematic diagram of an embodiment of a system in accordance with one or more embodiments described herein.

Applicant has recognized that various organizations (e.g., non-profit organizations such as schools, scout groups, sports teams, clubs, charities and religious organizations) rely on a volunteer "workforce" for help in raising financial support and awareness for the organization, its goals and endeavors. For example, some organizations ask its volunteers to raise funding by selling products on behalf of the organization, requesting donations or pledges in exchange for the volunteer participating in an activity (e.g., a marathon, biking or walking event) or simply requesting donations to the organization. Applicant has further recognized that such volunteers are often encouraged and relied upon to raise funding and awareness for the organization by turning to their networks of friends, family, community, colleagues and/or co-workers (collectively their "personal networks" herein). Many organizations recognize that a personal appeal from a friend or family member is significantly more likely to result in a donation or purchase which will raise funding and awareness for the organization than would an impersonal appeal from the organization itself. Applicant has still further recognized that many such volunteers do not have adequate knowledge or resources to maximize the effectiveness and/or efficiency of their fundraising or awareness-raising campaigns.

Applicant has further recognized that electronic communications aimed at raising funding or awareness for an organization (e.g., e-mail, tweets™, text-messages and/or web-site based messaging), if conveyed in a professional and entertaining manner utilizing both the goodwill of the organization and a personal appeal from a volunteer, may be one effective mechanism via which a volunteer of an organization may reach his/her personal network in an appeal or effort to raise funding and/or awareness for the organization. However, many volunteers lack the time, marketing and technology knowledge, resources or support to produce highly professional and effective electronic communications which leverage the goodwill of the organization.

Applicant provides herein various systems, articles of manufacture and methods which converge the resources of the organization (e.g., technology-savvy personnel, access to high quality graphics and design personnel and data, recognizable trademarks, etc.) with the power of a personal and customized request for support from a volunteer to his personal network or that of his family. For example, in accordance with some embodiments described herein, a system operated by or on behalf of a service which facilitates fundraising or awareness campaigns on behalf of third party organizations (i.e., organizations which are distinct from the entity or service which operates the systems and methods described herein) helps members or supporters of the third party organizations (also referred to as users herein) participate in a fundraising or awareness campaign ("campaign" herein) for the third party organization by facilitating the users' marketing efforts in asking their personal networks to donate to the organization, make pledges to the organization or purchase goods or services to support the organization. In some embodiments, the system may further facilitate the fulfillment of orders placed in response to such marketing efforts.

In accordance with some embodiments, systems, methods and articles of manufacture (e.g., non-transitory, computer-readable media) may provide for: (i) outputting to a user a first plurality of opportunities for providing information, the first plurality of opportunities pertaining to an appearance of the user (e.g., questions about the user's skin tone, hair color, eye color, preferred clothing style or articles of clothing, chosen accessories (trumpet, soccer ball, etc.), etc.); (ii) outputting to the user a second plurality of opportunities for providing information, the second plurality of opportunities pertaining to the user's reasons for participating in the campaign of the third party organization (e.g., reasons why the user is a member of the third party organization, values the third party organization(s) goals or has learned from the third party organization); (iii) generating, in response to information the user provides for the first plurality of opportunities, an avatar representing the user; (iv) generating, in response to information the user provides for the second plurality of opportunities, a customized online portal for the user, the online portal for use by the user in managing the user's participating in the campaign (e.g., an online portal comprising a web page to which the user can send a link to his personal network, and via which web page individuals of the personal network may make donations or purchase products to support the third party organization); (v) determining an award earned by the user in furtherance of the campaign (e.g., an award the user earned by meeting certain financial milestones of the campaign or an award the user earned by completing certain activities to customize or improve the content of the online portal); and (vi) updating a graphic associated with the avatar to indicate the award (e.g., showing a virtual representation of the award as being worn or held by the avatar or as being in a virtual room of the avatar, such as a virtual trophy on a shelf).

In accordance with some embodiments, systems, methods and articles of manufacture (e.g., non-transitory, computer-readable media) may provide for generating a customized online portal for facilitating a first user's efforts to support a third party organization, by providing for: (i) receiving, by an online portal generating controller comprising at least one processor and operable to communicate with a third party marketing content server and a plurality of user devices and from a first user device of a first user, a request to generate a customized online portal that features a customized avatar of the first user; (ii) storing in a memory data identifying the first user as a member of the third party organization; (iii) receiving, over a network and from the first user device of the first user, first data for customizing marketing content, the marketing content being for selling at least one product to at least one recipient, wherein a purchase of the at least one product is for a benefit to the third party organization; (iv) receiving, over the network and from the marketing content server of the third party organization, second data that is proprietary marketing content of the third party organization; (v) generating a customized online portal interface for the customized online portal based on the first data received from the first user device; (vi) generating the customized avatar of the first user by combining the first data received from the first user device and the second data received from the marketing content server; (vii) placing the customized avatar into the customized online portal interface; (viii) generating a unique URL that serves as an online address to the customized online portal interface; and (ix) transmitting, over the network, the unique URL to the at least recipient on behalf of the first user and the third party organization.

Certain aspects, advantages, and novel features of various embodiments are described herein. It is to be understood that not necessarily all such advantages may be achieved in accordance with any particular embodiment of the invention(s) described. Thus, for example, those skilled in the art will recognize that embodiments described herein may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention(s) described herein extend(s) beyond the specifically disclosed embodiments, examples and illustrations and includes other uses of the invention(s) and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Referring now to FIG. 1, illustrated therein is an example system 100 consistent with one or more embodiments. The system 100 comprises a Fundraising Server 110, a plurality of User Devices 120 and a plurality of Third Party Organization Servers 130. The system 100 is one example embodiment of a system which may be operable to facilitate at least some embodiments described herein.

In accordance with some embodiments, the system 100 may be useful in providing for a fundraising service (e.g., which may operate the Fundraising Server 110) which provides various tools and resources to allow a user who is a member or supporter of a third party organization to contribute to a campaign of the organization by establishing, through the fundraising service, a customized online portal which allows the user to (i) transmit to specified recipients (e.g., friends and family of the user) marketing messages (e.g., e-mail messages, text messages, tweets™, social website postings, etc.) which are generated in a customized format for the user; (ii) sell products or services on behalf of the organization the user is supporting or seek financial or non-financial donations or other contributions for the organization (which may, in some embodiments, involve the fundraising service facilitating the collection of payments and coordination of shipments of products); (iii) earn awards (awards having real-world monetary value and/or virtual awards) based on activities of the user in furtherance of the fundraising campaign; (iv) coordinate the user's fundraising efforts with those of other members or volunteers of the organization; and/or (v) track and promote the user's progress towards goals for the fundraising campaign (e.g., goals self-imposed by the user or set by the organization).

In accordance with some embodiments, the system 100 may be useful in providing for a fundraising service (e.g., which may operate the Fundraising Server 110) which provides various leaders or representative of various third party organizations (e.g., school organizers, PTA/PTO representatives, sports team coaches or managers, troop leaders, band managers, representatives of charity organizations) tools and resources to allow the leaders or representatives to customize a fundraising campaign, through the fundraising service by, for example: (i) outputting a plurality of available choices of goods or services that members or supporters of the organization can sell during the campaign (e.g., magazines, wrapping paper, food items, clothing items, gifts, seasonal items, etc.); (ii) providing a mechanism for setting at least one predetermined rule for participating in the campaign to be selected (e.g., participants must be registered with the organization or approved by the organization); (iii) providing a mechanism for setting at least one predetermined goal to be achieved by a participant of the campaign (e.g., a sales goal); (iv) providing a mechanism for setting at least one reward to be provided to users or supporters who participate in the campaign (e.g., real or virtual prizes, such as having the user's avatar added to or maintained in a group image (as described with respect to FIGS. 8A-8C) or earning items to be mailed to the user; and (v) providing a mechanism for selecting other parameters of the campaign (e.g., how purchased items are to be provided to purchasers, what forms of communication a participant may utilize when participating in the campaign, what forms of payment are accepted, the start and end dates of the campaign, etc.). Thus, in some embodiments, the fundraising service described herein provide a "one stop shopping" opportunity for an organization that desires to raise funds, which provides to organizers a variety of different items to sell, prizes to be earned, goals to be achieved, etc. In some embodiments, once a leader or organizer of a group sets up an account with the Fundraising Server 110 for a fundraising campaign, the leader or organizer can re-use at least some of the information for different or future campaigns (e.g., the leader or organizer can select different items to be sold or different prizes to be earned from one campaign to another while re-using previously provided data (e.g., logos, graphics, bank account information) by going through the same fundraising service for different campaigns).

As can be appreciated upon reading the present disclosure, the fundraising service described herein may be useful to various organizations which rely on a volunteer or other non-professional workforce in order to raise funding and/or awareness. For example, the fundraising service may receive, from a given third party organization, certain content such as trademarks, logos, images, articles, etc. to use in generating a customized online portal, avatar and marketing messages for a user. The fundraising service may also, in some embodiments, receive from a given organization, rules or standards of the organization to be applied to marketing efforts or fundraising or awareness campaigns for the organization. The fundraising service may also be operable to apply and apply such rules or standards to any marketing efforts of a user contributing to the fundraising or awareness campaign of the organization. For example, the fundraising service may apply such rules or standards to any online portal, avatar or marketing message generated, hosted or facilitated by the fundraising service (e.g., the fundraising service may ensure that any trademarks and logos of the organization are used in accordance with the instructions for such use set by the organization and that inappropriate content is not included by the user in marketing efforts of the user for the organization). The organization may thus benefit from having its interests professionally represented in a manner consistent with the goodwill it has earned and resources it has invested in developing its business reputation. The organization may further benefit by likely increasing the success of a fundraising or awareness campaign which relies on a volunteer or other non-professional workforce since the marketing efforts coordinated by the fundraising service, which incorporate both the content received from the organization and content received from a given user participating in a fundraising or awareness campaign for the organization.

In some embodiments, one or more of these User Devices 120 and/or Organization Servers 130 may be operable to communicate with Fundraising Server 110 via a network 115. The network 115 may comprise, for example, a mobile network such as a cellular, satellite or pager network, the Internet, a wide area network, another network or a combination of such networks. It should be understood that although not shown in FIG. 1, other networks and devices may be in communication with any of the devices of system 100 and/or that network 115 may comprise two or more networks operable to facilitate the routing of communications among the devices of system 700. For example, in one embodiment, both the Internet and a wireless cellular network may be involved in routing communications among two or more components of the system 100.

In some embodiments, additional devices that are not show in FIG. 1 may be part of a system 100. For example, one or more servers operable to serve as wireless network gateways or routers may be part of system 100. In other embodiments, some of the functionality described herein as being performed by Fundraising Server 110 may instead or in addition be performed by a server of another entity operating on behalf of the Fundraising Server 110 (e.g., the fundraising facilitation service which operates Fundraising Server 110 may outsource some functionality or otherwise allow some functionality to be performed by servers of other entities, such as registration of new users or new third party organizations, sharing of marketing content on social media sites, authorization of credit card transactions, etc.). In one example, if a user uploads a personal video for use in creating customized marketing content for the user, such video may be stored on a server of another entity and be accessible by Fundraising Server 110. In another example, marketing content comprising customized e-mails created by Fundraising Server 110 for a user may actually be transmitted to one or more recipients (e.g., the recipients for which a user provided e-mail addresses) by a server of another entity with which the entity operating Fundraising Server 110 has contracted for such services. Thus, a server of another entity may be a part of system 100 or otherwise be operable to communicate with Fundraising Server 110. It should be understood that any of the functionality described herein as being performed by the Fundraising Server 110 may in some embodiments be performed by such server of another entity.

The Fundraising Server 110 may comprise one or more computing devices, working in parallel or series if more than one, operable to facilitate the user's efforts in contributing to a fundraising or awareness campaign for an organization by appealing (e.g., for the purchase of products or donations to benefit the organization) to the user's personal network. The Fundraising Server 110 may be operated by or on behalf of an entity which offers services to facilitate such efforts of various users on behalf of one or more organizations in accordance with embodiments described herein. As described herein, the Fundraising Server 110 may be operable, in accordance with some embodiments, to (i) communicate with a User Device 110 (e.g., receive login credentials from the User Device, receive a selection of information for use in customizing an avatar for a user, receive information for use in customizing an online portal for the user, receiving contact information for a plurality of recipients to whom the user desires to transmit an appeal for the fundraising campaign, transmit a link to the customized online portal, etc.); (ii) generate, manage and/or update an appearance of an avatar for a user and/or content for a customized online portal for use by the user in managing participation in a fundraising campaign for an organization; and/or (iii) communicate with an Organization Server 130 (e.g., to receive data or information from one or more Organization Server1 130). Such information may comprise, for example content such as trademarks of the organization for use in creating an avatar and customized online portal for facilitating a fundraising campaign of the organization. The Fundraising Server 110 may further be operable to transmit data to one or more Organization Servers 130, such as data indicating progress of various users in their efforts to contribute to a campaign of the organization and/or data regarding success levels of respective users participating in the campaign, etc.

A User Device 120 may comprise a computing device associated with a user participating in a campaign for a third party organization or otherwise utilizing the services of the Fundraising Server 110. For example, a User Device 120 may comprise a personal computer such as a desktop, laptop or tablet computer, a cellular telephone or a smartphone or other mobile device. A User Device 120 may be operable, in accordance with some embodiments, communicate with the Fundraising Server 110 to (i) log in to the Fundraising Server 110 (e.g., to register, access a customized online portal for managing the user's participating in a campaign for a third party organization which is hosted by the Fundraising Server 110 and/or provide updated content for the customized online portal); (ii) receive an information address from the Fundraising Server 110 (e.g., a URL or link to the customized online portal hosted by the Fundraising Server 110, for transmission of customized marketing information to recipients); (iii) receive other information from the Fundraising Server 110 (e.g., rewards earned by the user, available content for inclusion in the user's customized online portal, an update on a progress of the user's participation in the campaign, etc.).

It should be noted that, in accordance with some embodiments, a user participating in a campaign of a third party organization may create customized marketing content by creating, via one or more modules or features of the Fundraising Server 110, an avatar (e.g., customized to represent the user based on information provided by the user, and in some embodiments further customized based on awards earned by the user) which is included in the marketing content. The marketing content may comprise, for example, a personalized online portal (e.g., an online store comprising one or more personalized web pages associated with the user), an e-mail message or other message and/or traditional postal mailings. Such marketing content may be transmitted by the user directly (e.g., the user may send an e-mail message which includes a link or URL generated by the Fundraising Server 110 to the user's personalized online portal). Alternatively, the marketing content may be transmitted by the Fundraising Server 110 (or another server or service operated by or one behalf of the same entity which operates the Fundraising Server 110). The marketing content may be transmitted to one or more recipients associated with the user (e.g., friends or family of the user, based on e-mail and/or postal addresses or other contact information for such recipients as indicated by the user).

A Third Party Organization Server 130 may comprise one or more computing devices, working in parallel or series if more than one, operable to communicate information to or from the Fundraising Server 110. Such information may comprise, for example, (i) content such as trademarks, logos, images or videos to be used in marketing efforts of a user (e.g., marketing content customized for the user) on behalf of an organization; (ii) rules or standards to apply to marketing content created on behalf of the user in support of a campaign of the organization; (iii) information defining a duration or goals (e.g., financial goals) of a campaign, to be used in managing or guiding the marketing efforts of users on behalf of the organization; (iv) awards available from the organization for meeting predefined goals by users contributing to a campaign of the organization; (v) financial information (e.g., a financial account identifier for an account into which funds collected for the organization by users via the fundraising server are to be deposited); and (vi) information or instructions for how orders placed (e.g., for the purchase of products the sale of which is for the benefit of the organization) by recipients via online portals of users are to be forwarded to the organization or another entity as directed by the organization (e.g., a fulfillment center or distributor of the products purchased). In accordance with some embodiments, an Third Party Organization Server 130 may comprise a server of a non-profit organization or group whose members serve as volunteers who participate in a campaign for the organization by appealing to their personal network for donations or purchases which raise funding and awareness for the organization.

It should be noted that whenever information is described as being "transmitted" to a device of system 100 or other systems described herein, it is intended to encompass both a "push" embodiment in which the information is proactively pushed or output to the device by another device and a "pull" embodiment in which the device contacts another device in order to query for any updated information or changes in information.

In some embodiments, any of the components 110, 120 and 130 may communicate with one another directly or indirectly, via a wired or wireless medium such as the Internet, LAN, WAN or Ethernet, Token Ring, or via any appropriate communications means or combination of communications means. For example, in one embodiment communication among any and all of the devices of system 100 may occur over the Internet through a Web site maintained by computer on a remote server or over an on-line data network including commercial on-line service providers, bulletin board systems and the like. In some embodiments, communication among any of the components of system 100 may occur over radio signals, cellular networks, cable network, satellite links and the like.

The system 100 may be operable to facilitate communication using known communication protocols. Possible communication protocols that may be useful in the system 100 include, but are not limited to: Ethernet (or IEEE 802.3), ATP, BLUETOOTH, SMPP Protocol (e.g., SMPP Protocol Version 3.4), HTTP, HTTPS, and Transmission Control Protocol/Internet Protocol (TCP/IP). Communications may be encrypted to ensure privacy and prevent fraud in any of a variety of ways well known in the art, some of which are described herein.

It should be understood that any or all of the devices of system 100 may in some embodiments comprise one or more of (i) an input device; (ii) an output device; (iii) an input/output device; or (iv) a combination thereof.

An input device, as the term is used herein, may be any device, element or component (or combination thereof) that is capable of receiving an input (e.g., from a user or another device). An input device may communicate with or be part of another device. Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale.

An output device may comprise any device, component or element (or a combination thereof) operable to output information from any of the devices described herein. Examples of an output device include, but are not limited to, a display (e.g., in the form of a touch screen), an audio speaker, an infra-red transmitter, a radio transmitter, an electric motor, a dispenser, an infra-red port, a Braille computer monitor, and a coin or bill dispenser.

An input/output device may comprise components capable of facilitating both input and output functions. In one example, a touch-sensitive display screen comprises an input/output device (e.g., the device outputs graphics and receives selections from an authorized person).

Figure 2:
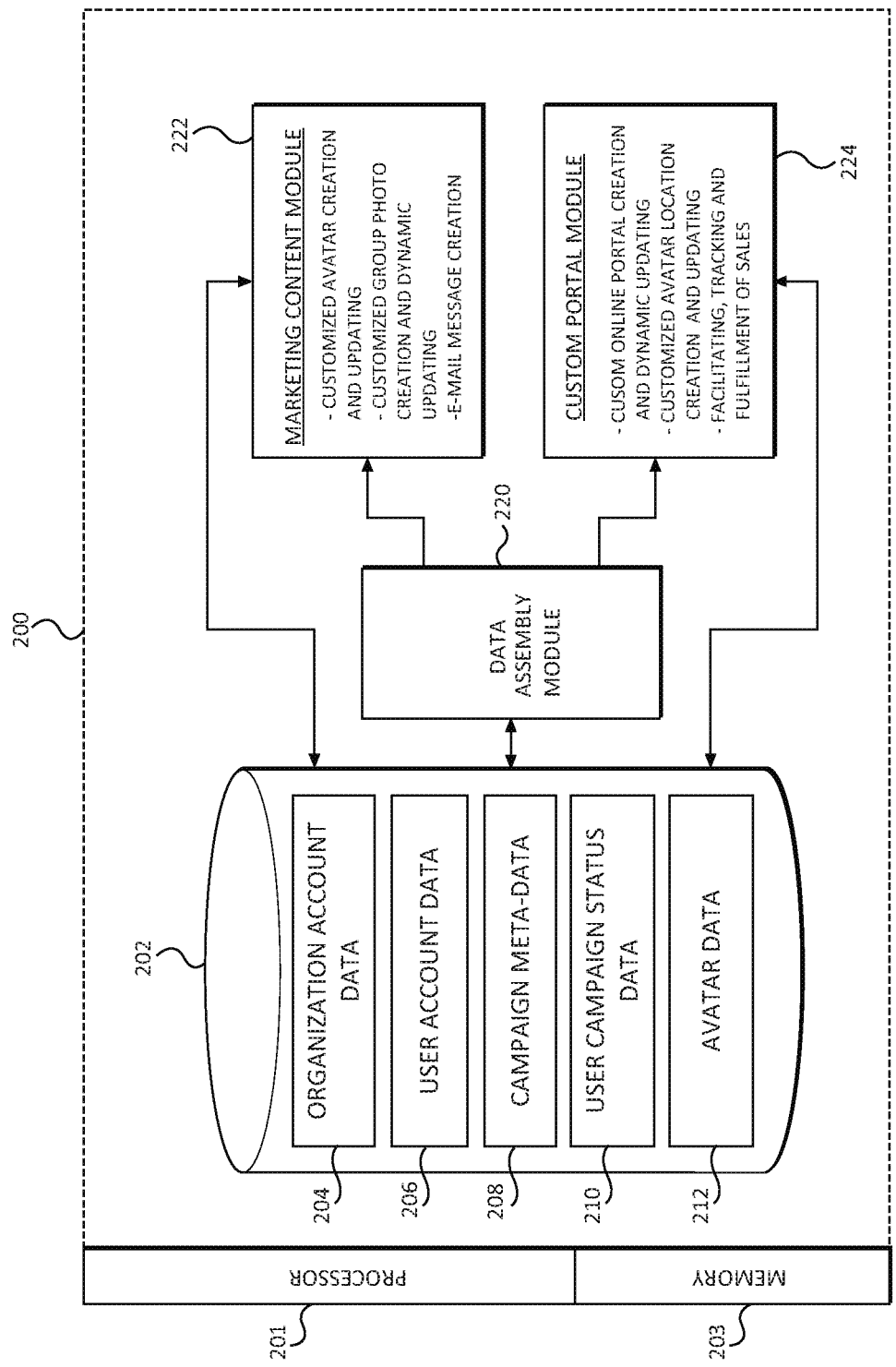
FIG. 2 is a block diagram of an embodiment of a computing device useful in a system according to one or more embodiments described herein.

Referring now to FIG. 2, illustrated therein is a computer system 200, which may be useful for implementing one or more embodiments described herein. For example, the computer system 200 may, according to some embodiments, be configured to marketing content (e.g., a customized avatar, one or more customized web pages featuring the avatar and/or one or more e-mail messages featuring the avatar) for a campaign associated with a particular third party organization using (i) information provided by a user; and (ii) information provided by the third party organization. The system 200 may be implemented using one or more processors, such as processor 201, in conjunction with one or more tangible computer readable storage medium devices, such as memory device 203. The operations described herein may be divided across a plurality of computing systems, and are shown to reside in a single processing device of FIG. 2 so as to simplify the description. The computer system 200 may, for example, be operated by or on behalf of an entity which facilitates marketing efforts in furtherance of third party organizations by communicating with (i) one or more users and (ii) one or more third party organizations. In one embodiment, system 200 may comprise the Fundraising Server 110 of system 100 (FIG. 1).

In some embodiments, additional devices or components that are not shown in FIG. 2 may be part of a system for facilitating marketing content created to help users support campaigns for third party organizations, as described herein. For example, one or more servers operable to serve as wireless network gateways or routers may be part of such a system. In other embodiments, some of the functionality described herein as being performed by system 200 may alternatively or in addition be performed by a third party server operating on behalf of the system 200 (e.g., the entity operating the Fundraising Server 110 may outsource some functionality, such as registration of new users, fulfillment of orders, collecting of payments or outputting of marketing messages). Thus, a third party server may be a part of a system, such as that illustrated in FIG. 2. It should be understood that any of the functionality described herein as being performed by the system 200 may in some embodiments be performed by such a third party server. For example, one or more of the functions or processes described herein as being performed by system 200 or a component thereof (e.g., a module or software application of system 200) may be implemented with the use of one or more cloud-based servers which, in one embodiment, may be operated by or with the help of a third party distinct from the entity to which users and third party organizations provide information in order to create customized marketing content in furtherance of campaigns to benefit the third party organizations. In other words, while in some embodiments the computerized system 200 may be implemented on servers that are maintained by or on behalf of a particular company or business which helps create such customized marketing content, in other embodiments the system 200 may at least partially be implemented using other arrangements, such as in a cloud-computing environment, for example.

The computer system shown in the embodiment of FIG. 2 includes a database 202, which may store one or more of the following: (i) organization accounts data records 204, which may include information for third party organizations for which the computer system 200 facilitates campaigns; (ii) user accounts data records 206, which may include information for users who utilize the services facilitated by computer system 200 to participate in one or more campaigns for one or more third party organizations; (iii) campaign meta-data data records 208, which may include general information (i.e., not specific to any particular user or specific group of users, such as a particular class in a school, a team in a sports organization or a troop or den in a scout organization) for one or more campaigns being facilitated by computer system 200; (iv) user campaign status data records 210, which may include information specific to a user or particular group of users and a status of a campaign in which the user or group of users is participating; and (v) avatar data records 212, which may include information pertaining to the creation of customized avatars (e.g., data regarding options for customizing an appearance of an avatar, which may in some cases be specific to a particular third party organization).

The organization accounts data records 204 may comprise, for example, a respective record for each third party organization which participates in the services facilitated by system 200. Each record may store, for example, (i) contact information for a representative of the third party organization; (ii) identifiers for members or groups associated with the third party organization (e.g., if the third party organization is a sports organization, this information may comprise information on one or more teams, the coaches of the teams and the players on the teams while if the third party organization is a scout organization, this information may comprise information on the troops, dens or packs of the organization, the leaders and the scouts associated with each leader); (iii) payment account data (e.g., an identifier or credentials for providing payment to or receiving payment from the third party organization); and (iii) rules or conditions for use of any logos, trademarks or other property of the third party organization in marketing content created by the system 200.

The user account data records 206 may comprise, for example, a respective record for each user who participates in one or more campaigns of one or more third party organizations through the services facilitated by system 200. Each record may store, for example, (i) a name of a user; (ii) contact information for the user; (iii) a unique identifier for the user as assigned, generated or used by system 200 to uniquely identify the user; (iv) information for a parent or guardian of the user if the user is a minor; (v) an identifier of one or more third party organizations with which the user is associated (e.g., an identifier of one or more employers, charities, sports teams, classes and/or scout groups with which the user is associated); (vi) an identifier of one or more groups within a third party organization with which the user is associated (e.g., if the user is a student of a particular school, the user's particular class and/or teacher may be identified; if the user is a scout, the user's troop and/or leader may be identified); (vii) an identifier of one or more particular campaigns the user has or is participating in; (viii) an indication of one or more awards (virtual or otherwise) the user has earned or is in the process of earning (which awards may be specific to a particular third party organization in some embodiments); and (ix) data identifying or representing a customized avatar or other representation of a user which has been created for the user by the system 200. In some embodiments, at least some data stored in a record of a user may be persistent and usable in more than one campaign or for more than one third party organization. For example, an avatar created for the user based on information about the user's appearance may be associated with the user and an indication or identifier of that avatar may be stored in the user's record, such that it can be repurposed or reusable for different campaigns.

In some embodiments, an avatar created for a specific user may be modified for different campaigns or different third party organizations. For example, an avatar created for a user may be shown as wearing a uniform of a first third party organization when it is used in marketing content for a campaign of the first third party organization but may be shown as wearing a different uniform or apparel (e.g., a scout uniform) when it is used in marketing content for a campaign of a second third party organization which the same user is participating in. Similarly, any awards earned by the user in participating in a first campaign may be shown on the uniform or other apparel of the avatar when it is being represented in marketing content for that first campaign but may be removed from the uniform or other apparel of the avatar when it is being represented in marketing content for a different campaign. In some embodiments, the user account data record of a particular user may be accessible via stored login credentials (e.g., user name and password). Such login credentials may be used, for example, by the user, a parent of a user (e.g., if the user is a minor) and/or another permitted person to modify and access the data in the user record. In some embodiments, data of a user (e.g., avatar data) may be provide to a user for use in other systems or transmitted so systems of other entities for use (e.g., at the user's request, data comprising an avatar created for the user may be transmitted to another entity's system for use in games, on merchandise, etc.). An example of a record of the user account data records 206 is illustrated in FIG. 3A.

In some embodiments, a user may give permission to the fundraising service to have his/her avatar used for purposes other than a fundraising campaign. For example, an avatar may be utilized in materials, documents, marketing messages or videos used to train persons associated with campaigns (e.g., parents of school children, team, group or troop members; volunteers; students; organization leaders or organizers; etc.). In some embodiments, when an avatar of a particular user is utilized for such purposes the avatar may be used anonymously (i.e., in a manner that does not provide the identity of the user who created the avatar, such as the user's name). In some embodiments, the use of an avatar (whether for purposes within a campaign such as in marketing messages sent to recipients by a user or for other (e.g., training) purposes, may include functionality such as providing animation or a voice for the avatar.

The campaign meta-data data records 208 may comprise, for example, a record for each respective campaign of a third party organization which is facilitated by the system 200. For example, if the third party organization is a school, each fundraising campaign for the school may have its own record in the campaign meta-data records 208. If a third party organization is associated with more than one campaign (whether running simultaneously or otherwise), some data which is applicable to the more than one campaign may be duplicated, stored or accessible for each record of each respective campaign. The data stored in a campaign meta-data record may be any data which is generally applicable to any group or user participating in the campaign, such as goals or purpose of the campaign, products available for purchase during the campaign, fulfillment entities responsible for fulfilling purchases made in support of the campaign, awards (virtual or real-world) which may be earned by a user participating in the campaign (and, for example, the corresponding condition(s) for earning each respective award), contact information for an authorized person of the third party organization regarding questions on the campaign, etc. For example, the third party organization may set criteria or parameters for a fundraising campaign, such as sales dates, controls for questions to be filled out by users and/or recipients (e.g., in creating custom marketing content), upload a default video or photo to be used in marketing content (e.g., if user elects not to upload a video or photo of their own), permissions or limitations for users to provide certain content (e.g., photos, videos, links to other websites, etc.).

In one embodiment, the third party organization may provide to the system 200 information about sub-groups or groups of users authorized by the third party organization to participate in a campaign and such information may be stored in a campaign meta-data data record 208. For example, the third party organization may provide the names or other identifiers of user, a name or other identifier of a particular group of users (e.g., a scout troop number, a classroom, a team, etc.), a name or other identifier for one or more leaders of a particular group of users (e.g., a scout leader, a principal or teacher of a school, a coach of a team, a leader of a work-group team, etc.). Information on such individuals may also include contact information (e.g., e-mail addresses, telephone numbers) and/or login credentials. For example, in one embodiment the third party organization may provide or cause a creation of a user name and password for each authorized user authorized to participate in the campaign, which may be separately provided to the respective user for use in accessing a website of the service which facilitates campaigns of third party organizations by creating custom marketing content such as avatars or custom online portals, as described herein. In one embodiment, the third party organization providing data to the system 200 may contact the users authorized to participate in a campaign via the system 200 by e-mailing them information (e.g., a link or other information for accessing a website of the service operating system 200).

The user campaign status data 210 may comprise, for example, a record for each respective campaign being participated in by a particular user. Thus, when a user accesses system 200 (or a service operated by an entity which operates system 200) to create custom marketing content for participating in a campaign of a third party, a record for that user's participation in that particular campaign may be created and stored. A record comprising user campaign status data 210 may comprise, for example, one or more of (i) an identifier of the user; (ii) an identifier of the campaign in which the user is participating; (iii) an identifier of a group of users with which the user is affiliated (e.g., a scout troop or den number, a team identifier, a school or classroom identifier, etc.); (iv) identifiers of one or more other users with which the user is associated (e.g., identifiers of one or more uses who are also members of the same scout troop or den, on the same team, in the same classroom, etc.); (v) goals associated with the user's participation in the campaign (e.g., sales goals set by the third party organization, the user, or a leader associated with a group of which the user is a member); (vi) awards earned by the user (e.g., virtual or real-world); (vi) customization choices made by the user (e.g., for marketing content, such as appearance of an avatar representing the user, or e-mail messages for recipients; or for a location of the avatar (e.g., appearance of a virtual room or locker with which the avatar is output to the user); (vii) information for one or more recipients, as provided by the user for transmission of marketing content in support of the campaign; (viii) an indication of sales, donations or pledges made by recipients in support of the user's participation in the campaign; and (ix) an indication of the user's progress or status in the campaign. An example of a record of the user campaign status data records 210 is illustrated in FIG. 3B.

The avatar data records 212 may comprise, for example, a record for each respective avatar created by a user and/or data useful for providing choices to a user who is creating an avatar. For example, in one embodiment the avatar data records 212 store data comprising a customized avatar created for a user based on selections made by the user (e.g., hair color, skin tone, hair style, body shape, apparel, etc.) and awards earned by the user (e.g., in some embodiments an avatar of a user may represent an award earned by the user in the form of a medal, patch, pin or other indicator which may be worn by the avatar). In some embodiments, the avatar data records 212 may also store templates or data choices for customizing an avatar (e.g., as provided by a third party organization). For example, for third party organization A which comprises a sports team, the avatar choices may include a choice of sports jersey (e.g., different colors, length of sleeves, etc.) and jersey number while for third party organization B which comprises a scout group, the avatar choices may include choice of uniform pieces, uniform colors, hats, belt loops, patches, etc.

The database 202 may, for example, be implemented using any well-known database management systems, including Microsoft SQL, Oracle, IBM DB2, etc. It should be noted that in some embodiments, database 202 (or at least some of the data described as being stored therein) may be stored in memory 203 and/or in another memory device accessible to the memory 203 and/or to processor 201. For example, in one embodiment database 202 (or at least some of the data described as being stored therein) may be stored in a memory of a third party server, such as a server of a cloud-based computing service with which a company (e.g., a company which facilitates the campaigns of third party organizations which are being participated in by one or more users) may contract for purposes of storing data.

In accordance with some embodiments, the system 200 may further comprise one or more modules, programs, or processor instructions for performing at least some of the functionalities described herein. In the example embodiment of FIG. 2, the system 200 may further comprise one or more software module(s) 220-224 for directing the processor 201 to perform certain functions. In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms. Further, although certain functionality may be described as being performed by a particular module, such description should not be taken in a limiting fashion. In other embodiments, functionality described herein as being performed by a particular module may instead (or additionally) be performed by a different module, program, sub-routine or computing device without departing from the spirit and scope of the invention(s) described herein.

It should be understood that any of the software module(s) or computer programs illustrated therein may be part of a single program or integrated into various programs for controlling processor 101. Further, any of the software module(s) or computer programs illustrated therein may be stored in a compressed, uncompiled, and/or encrypted format and include instructions which, when performed by the processor 101, cause the processor 101 to operate in accordance with at least some of the methods described herein. Of course, additional and/or different software module(s) or computer programs may be included and it should be understood that the example software module(s) illustrated and described with respect to FIG. 1 are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to an embodiment, the instructions of any or all of the software module(s) or programs described with respect to FIG. 2 may be read into a main memory from another computer-readable medium, such from a ROM to RAM. Execution of sequences of the instructions in the software module(s) or programs causes processor 201 to perform at least some of the process steps or functionalities described herein. In alternate embodiments, hard-wired circuitry may be used in place of, or in combination with, software instructions for implementation of the processes of the embodiments described herein. Thus, the embodiments described herein are not limited to any specific combination of hardware and software.

In the example embodiment illustrated in FIG. 2, a data assembly module 220 is illustrated as communicating with (i) the memory 202, (ii) a marketing module 222 and (iii) a custom portal module 224. The modules 220-224 are illustrated as being accessible to processor 201 to implement one or more embodiments described herein. As described, one or more of the modules 220, 222 and 224 may be operable to utilize at least some of the data stored in database 202. Further, in accordance with some embodiments, one or more of the modules 220, 222 and 224 may be operable to retrieve, manipulate, select, and/or otherwise determine data that is transmitted to and stored in database 202.

Data assembly module 220 may, in accordance with some embodiments, operate to manipulate the data from database 202 into appropriate records for processing by the marketing module 222 and by the custom portal module 224. For example, data assembly module 220 may be operable to create a custom avatar and/or other marketing content (e.g., such as a custom online portal and e-mail messages), based on some of data stored in a first record or entry of database 202 (e.g., based on data in the user accounts data records 206 and avatar data records 212), and transmit an indication of the custom avatar and/or other marketing content for storage in another record or entry in the database 202 (e.g., for entry in a user campaign status data records 210) and/or to transmit such data for use by marketing module 222 and custom portal module 224.

In accordance with some embodiments, the marketing module 222 may be operable to create and facilitate marketing content using at least some data stored in memory 202. For example, in one embodiment, marketing module 222 may be operable to create a customized avatar or other representation of a user. For example, avatar data received from a third party organization (e.g., available uniforms or insignia) associated with a particular campaign being participated in by the user may be combined with personal data provided by the user regarding the user's appearance (e.g., hair color, skin tone, hair style, eye shape and color, etc.) to create a customized avatar for the user.

In some embodiments, various emojis, pictograms or virtual stickers may be made available to users for creating marketing messages for a campaign. In some embodiments, such emojjis, pictograms or virtual stickers may be customized for or by the third party organization corresponding to the fundraising campaign (e.g., if the fundraising campaign is for a sports team that has a tiger as a mascot, tiger-face emojis, pictograms or virtual stickers may be generated or made available for users). In some embodiments, an organizer of a campaign may be provided with tools for selecting or customizing emojis, pictograms or virtual stickers to be made available to participants of the campaign. In some embodiments, the use of such emojiis, pictograms or virtual stickers may need to be earned (e.g., by satisfying one or more corresponding conditions that an organizer of the campaign may set). For example, a user may be provided with an option to customize marketing messages such as e-mails, text messages or his/her personalized online portal with such emojis, pictograms or virtual stickers. In some embodiments, a user may be provided with a mechanism to customize his/her own emoji, pictogram or virtual sticker. For example, the user may be allowed to customize an emoji, pictogram or virtual sticker to reflect a characteristic of the user, such as skin tone, hair or wearing glasses and/or to reflect a characteristic of the organization associated with a fundraising campaign (e.g., to include a baseball hat with the logo of a team, if the organization comprises a sports team). In some embodiments, the marketing module 222 may store one or more files (or addresses or other indications of such files) comprising one or more emojis, pictograms or virtual stickers that are available for at least one campaign.

In some embodiments, as additional campaign status data is received or updated in user campaign status data records 210 the data assembly module 220 may communicate an indication of such new or modified data to one or more of the marketing module 222 and the custom portal module 224. For example, as a user achieves a sales goal based on purchases made by recipients due to the user's marketing efforts the user may earn a virtual award and an indication of such earned virtual award may be incorporated into the customized online portal created by the custom portal module 224. In one particular illustrative example, an identifier of a particular campaign a user is participating in may be stored in a record of the user campaign status data records 210. An available virtual award and the criteria for earning the virtual award may also be stored in the record (or, in some embodiments, in a record of the campaign meta-data records 208). Thus, as purchases are made by recipients via the user's customized online portal it may be determined based on the criteria that the user has earned the virtual award. An indication of the user earning the virtual award may be communicated to the custom portal module 224 by the data assembly module 220 and the user's customized online portal may be updated to reflect the earned award. For example, a representation of the user's earned virtual award may be indicated in a location of the avatar (e.g., a virtual room or virtual locker) generated for the user or may be indicated in additional text included in a page of the online portal or e-mail messages transmitted to recipients. Similarly, in some embodiments, an appearance of the avatar created for the user may be modified (e.g., by the marketing module 222) based on an indication that the user has earned a virtual award. For example, apparel of the avatar may be modified to show a medal or patch representing the virtual award. Of course, as described herein, in some embodiments real-world awards may be earned by a user as a result of the user's participation in a campaign (e.g., the user may earn a physical patch, monetary or other prize which may be mailed or otherwise provided to the user). In such embodiments, an indication of the real-world award earned by the user may also be indicated to the user and/or recipients via the user's customized online portal and/or the appearance of the avatar or other representation of the user.

In some embodiments, marketing module 222 may further be operable to facilitate usage of marketing content created for a user, such as a customized avatar or other representation of a user, along with other data, in creating marketing content such as e-mail messages (e.g., using a personalized paragraph or other text provided by user). In some embodiments, marketing module 222 may be operable to facilitate a user sharing marketing content using social media (e.g., post messages including the avatar or another representation of the user to sites such as FACEBOOK™, TWITTER™, TUMBLR™ or GOOGLE+™). In some embodiments, marketing module 222 may be operable to prepare marketing content for printing (e.g., personalized sales flyers, letters or brochures).

In some embodiments, a user may upload a photo, video or other content (which, for example, may be stored in the user account data records 206 or, if it is specific to a particular campaign the user is participating in, in the user campaign status data records 210 if provided for use in a particular campaign) and such photo, video or other content may also be passed to and utilized by marketing module 222 in creating marketing content. Similarly, in some embodiments a third party organization may upload a photo, video or other content for inclusion in marketing content created for a user who is participating in a campaign of the third party organization. Such content uploaded by a user or third party organization may be stored in memory 202 (e.g., in a record of organization account data records 204, if usable in more than one campaign, or in a record of user campaign meta-data data records 208, if uploaded for use in a particular campaign of the third party organization).

The custom portal module 224 may, in accordance with some embodiments, be operable to utilize data from memory 202 (and, in some embodiments data created by marketing module 222, such as the custom avatar or other representation of a user created for a user) to create a customized online portal. A customized online portal may comprise, for example, one or more web pages created for the purpose of allowing the user to participate in a campaign of a particular third party by allowing recipients specified by the user (e.g., recipients of customized e-mails created and transmitted via marketing module 222) to purchase products or otherwise support the campaign (e.g., make donations or pledges to the third party organization associated with the campaign) using links or other functionality on the one or more web pages. In some embodiments, the customized online portal may include data from the memory 202 such as (i) group information (e.g., school information, classroom information, scout group information, etc., of the group associated with the user for whom the customized online portal is being created); (ii) third party organization information (e.g., logos, trademarks, descriptions of the third party organization); (iii) a customized message from the user (e.g., whether in text, video or audio form); (iv) one or more goals associated with the user (e.g., a personal sales or pledge goal set by the user and/or a group with which the user is associated); and/or (v) an indication of one or more goals or awards earned by the user as a result of recipients supporting the campaign being participated in by the user.

Referring now to FIGS. 3A and 3B, each of these figures illustrates a respective table, each table comprising an example structure and sample contents of a database or portion of a database (e.g., a record of a database) that may be useful in some embodiments. In particular, the example tables represented in any of FIGS. 3A and 3B may be useful in facilitating a user's utilization of services provided by an entity which creates customized marketing content (e.g., customized avatars or other representations of a user, customized online portals, etc.) for aiding a user's support and participating in one or more campaigns of one or more third party organizations (a "User Fundraising Service" herein). In accordance with some embodiments, table 300A illustrated in FIG. 3A may comprise an example of a record of the user account data records 206 (FIG. 2) and table 300B in FIG. 3B may comprise an example of a record of the user campaign status data records 210 (FIG. 2).

The data and fields of the tables 300A and 300B can be readily modified, for example, to include more or fewer data fields. A single database or table that is a combination of multiple databases or tables, or a configuration that utilizes multiple databases or table for a single database or table illustrated herein may also be employed. In the databases of FIGS. 3A and FIG. 3B, a different reference numeral is employed to identify each field. However, in at least one embodiment, fields that are similarly named (e.g., a user identifier) may store similar or the same data in a similar or in the same data format.

As will be understood by those skilled in the art, the schematic illustration and accompanying descriptions of data contained in the sample tables presented herein is an exemplary arrangement for stored representations of information. Any number of other arrangements may be employed besides those suggested by the tables shown. For example, the embodiments described herein could be practiced effectively using more or fewer functionally equivalent databases or tables. Similarly, the illustrated entries of the databases or tables represent exemplary information only; those skilled in the art will understand that the number and content of the entries can be different from those illustrated herein. Further, despite the depiction of the databases as tables, an object-based model could be used to store and manipulate the data types of one or more embodiments and likewise, object methods or behaviors can be used to implement the processes of one or more embodiments.

Turning now to FIG. 3A in particular, illustrated therein is a table 300A, defining information for a user who may participate in one or more campaigns of one or more third party organizations as described herein. The information in a record such as that illustrated in table 300A may be received, determined, generated and/or store, for example, when a user first requests or agrees to establish an account with the system 200. Further, the information in a record such as that illustrated in table 300A may comprise information which may be utilized or repurposed for more than one campaign and/or for supporting more than one third party organization (e.g., the list of recipients and contact information for each recipient need only be entered by a user once and then re-used and accessed for more than one campaign in which the user participates).

The record 300A comprises a plurality of fields, each field storing data associated with a particular user. In particular, the record 300A comprises (i) a user identifier field 302A, which stores an identifier for uniquely identifying the user (e.g., an alphanumeric identifier generated by the system 200 or selected by the user or a group leader); (ii) a campaign identifier 304A, which stores a respective unique identifier for each campaign the user has or is participating in (in accordance with some embodiments, a campaign identifier may uniquely identify a campaign which has or is being facilitated by the system 200 and may correspond to a record of the campaign meta-data data records 208A, which may store additional data on the particular campaign); (iii) a login credentials field 306A, which may store a user name and password which the user (or another authorized person, such as the user's guardian if the user is a minor) to access and modify data associated with the user; (iv) an avatar identifier field 308A, which stores an identifier uniquely identifying the avatar or other representation of the user created by the system 200 for the user (e.g., based on information or selections provided by the user) and which may serve as (or have stored in association therewith) a data file comprising the avatar; and (v) a recipient identifier(s) field 310A which stores at least one recipient identifier for each recipient input by the user (a recipient comprising a person to whom marketing content may be transmitted; in some embodiments the recipient identifier may be uniquely generated by the system 200 while in others it may comprise an e-mail address, nickname or other indicated provided by the user).

Of course, additional or different information associated with a user may be stored in a user record. For example, an indication of one or more groups of a third party organization of which the user is a member may be stored (e.g., the user's troop or den number if the user is a scout and/or an indication of a team of which the user is a member). It should be noted that, in accordance with one embodiment, the avatar identifier stored in field 308A may comprise an identifier of a default avatar created for the user (e.g., based on information provided by the user about the user's physical appearance) but without any specific indicators, insignia or apparel (e.g., uniforms) of any particular third party organization. In accordance with some embodiments, such a default avatar may be created such that it may be repurposes for different campaigns of different third party organizations (e.g., by adding a uniform specific to the third party organization to the image of the avatar) and such a further customized avatar file may be stored under a different identifier or within a record of the user campaign status data records 210 (FIG. 2 and FIG. 3B).

In accordance with some embodiments, a user's avatar may be stored by the Fundraising Server 110 for use in future campaigns. In some embodiments, different versions of a user's avatar may be stored. For example, a user may create a first version of an avatar for use in a first campaign (e.g., an avatar wearing a sports jersey, for a campaign to support the user's sports team) and a second version of an avatar for use in a second campaign (e.g., the avatar wearing a scout troop uniform, for a campaign to support the user's scout troop). Thus, when a user logs in and begins to participate in a new campaign, the user can select which version of his/her avatar he would like to use (or create a new version). In some embodiments, a "photo album" of the different versions of the user's avatar may be generated by the system. Such a photo album may be a virtual photo album (which may, in some embodiments, be accessible via a user interface such as that illustrated in FIGS. 8A-8C, such as by selecting a virtual photo album off a shelf in the avatar's virtual room) or a tangible printed photo album that may be printable by the user or mailed to the user. In some embodiments, different versions of the user's avatar may represent the user at different ages. For example, if the user continues to use the fundraising service over a period of years beginning when the user is a child, the avatar may reflect the changes in the user over the years (e.g., the avatar may become taller, have different hairstyles, get glasses, etc.). In other words, the user may create different versions of his/her avatar to reflect any physical changes in the user over time. In some embodiments, if the user agrees, the Fundraising Server 110 may store these various versions of the user's avatar and/or generate a photo album, slide show, video or other representation to illustrate how the user and thus the user's avatar has changed over time.

Referring now to FIG. 3B, illustrated therein is a table 300B, defining information for a user's participation in a particular campaign of a third party organization. The information in a record such as that illustrated in table 300B may be received, determined, generated and/or stored, for example, when a user first indicates his/her participation in a particular campaign of a third party (and, in some embodiments, is authorized to so participate based on information received from the third party organization or another person such as a leader of a group authorized to participate in the campaign). The information stored in record 300B may be used to track the user's progress or status in the campaign such that certain marketing content may be updated (e.g., dynamically updated based on changes in the information or periodically based on scheduled analysis of the information). For example, any of the following may be updated based on changes to the information stored in record 310B: (i) an appearance of an avatar may be updated (e.g., medals, patches or uniforms may be added or modified), (ii) an appearance of a virtual location associated with the avatar may be updated (e.g., trophies or other virtual awards may be added to a virtual room or virtual locker of the avatar), (iii) information output to recipients in a custom online portal or e-mail message may be updated (e.g., how close the user is to meeting a sales goal may be updated as set out on a web page); and (iv) a group image of the user's avatar and avatar's of other associated users may be updated as avatars are created or modified for the other associated users.

Figure 6:
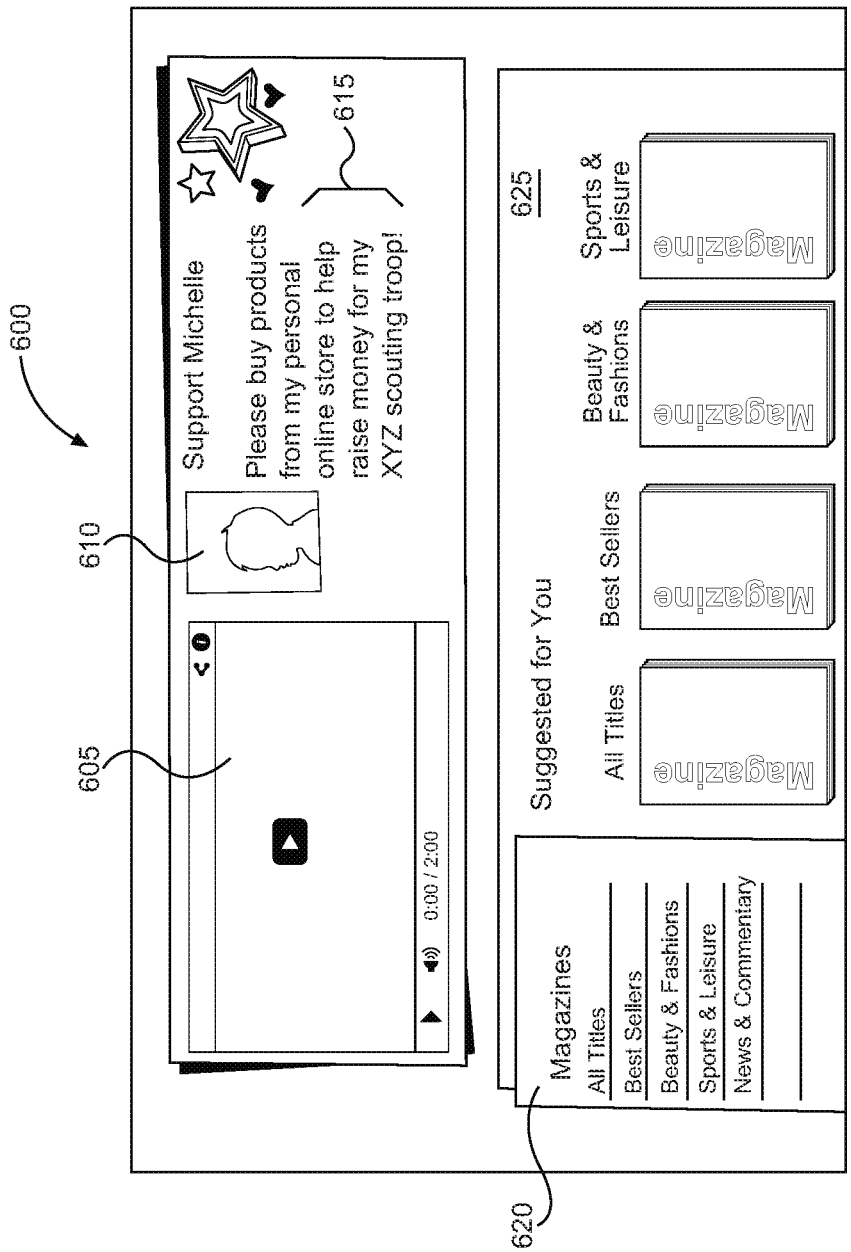
FIG. 6 comprises one example embodiment of a web site interface for facilitating one or more embodiments described herein.
Figure 8A:
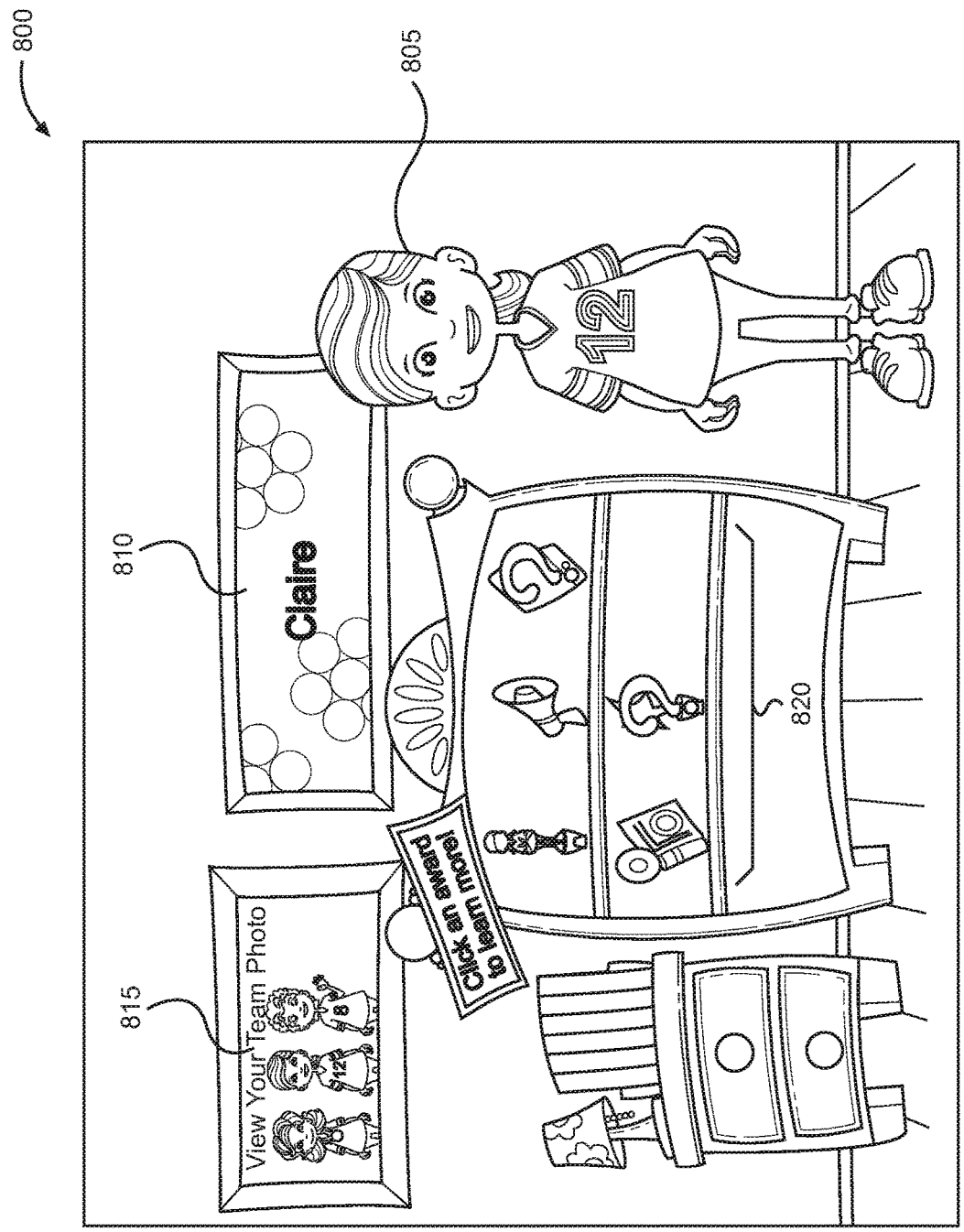
FIG. 8A comprises one example embodiment of a web site interface for facilitating one or more embodiments described herein.
Figure 8B:
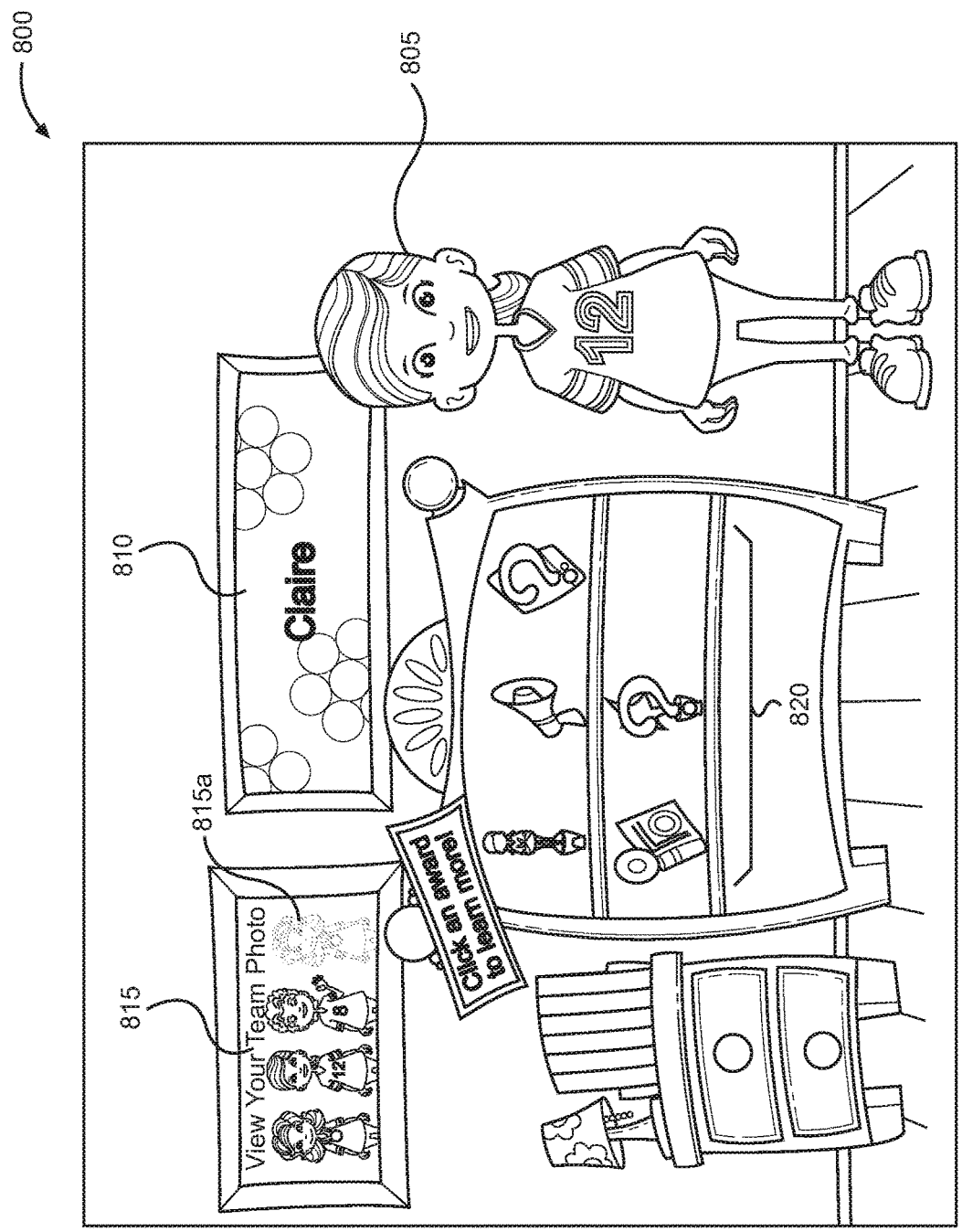
FIG. 8B comprises one example embodiment of a web site interface for facilitating one or more embodiments described herein.
Figure 8C:
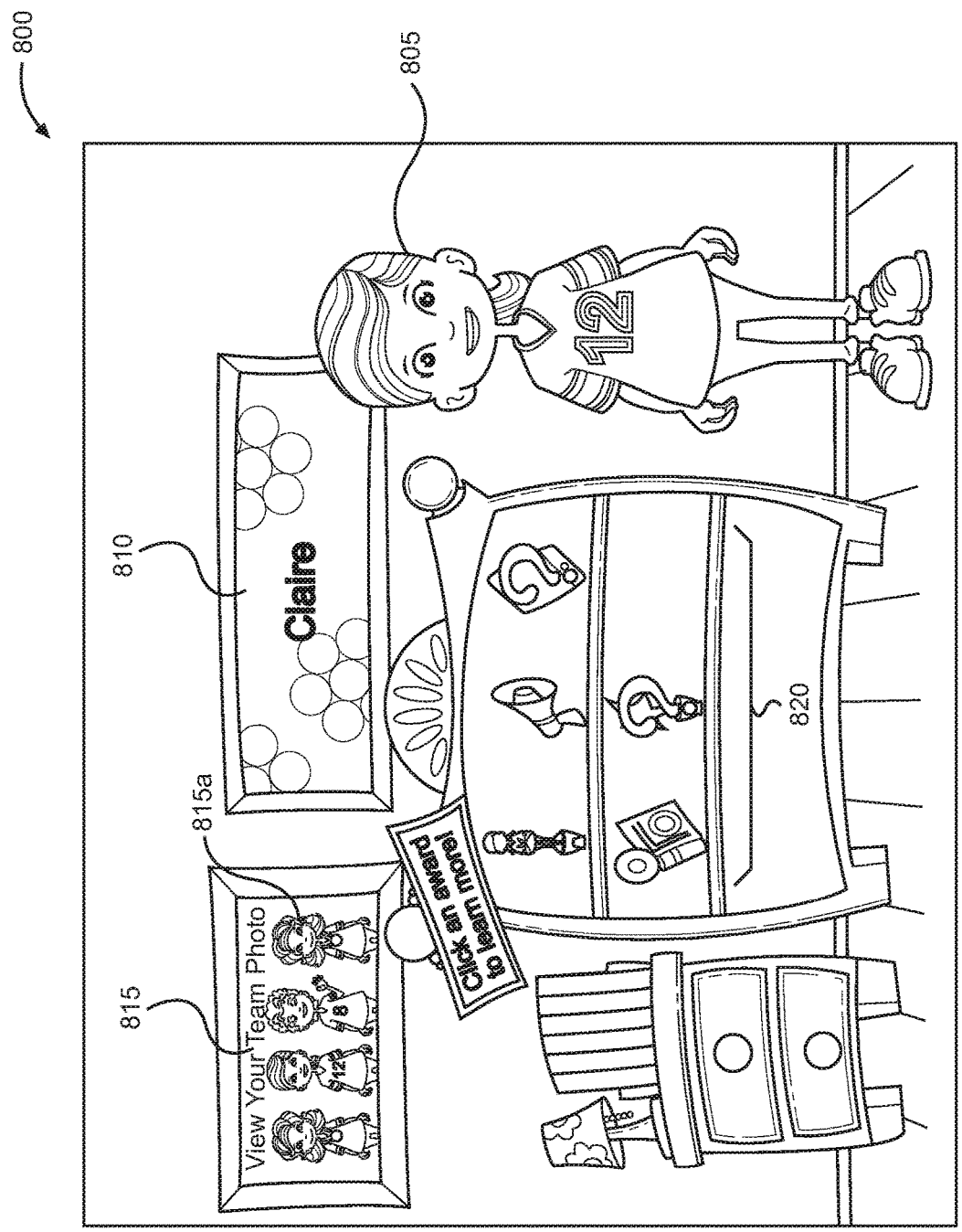
FIG. 8C comprises one example embodiment of a web site interface for facilitating one or more embodiments described herein.
Figure 9:
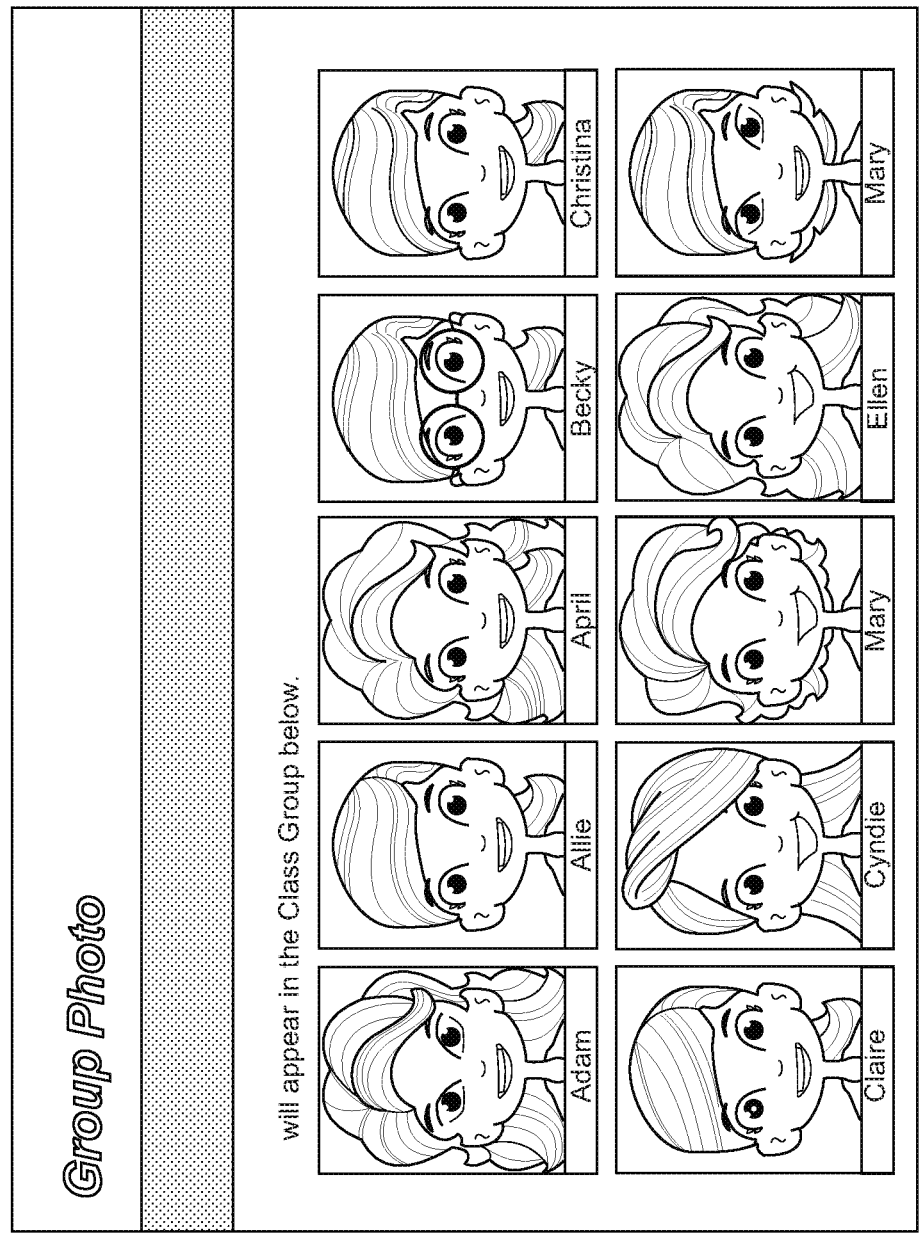
FIG. 9 comprises one example embodiment of a web site interface for facilitating one or more embodiments described herein.

In particular, the record 300B comprises a plurality of fields or entries, each defining a status of the user's participation in a particular campaign. The illustrative example fields of record 300B comprise: (i) a user identifier field 302B, which uniquely identifies the user of the record (which may be a key field utilized to retrieve data defining the user from a record of the user account data records 206 of FIG. 2); (ii) a campaign identifier field 304B (which may be a key field utilized to retrieve data defining the campaign from a record of the campaign meta-data record 208 of FIG. 2); (iii) an avatar identifier field 306B (which may be a key field utilized to retrieve data defining the avatar from a record of the avatar data 212 of FIG. 2); (iv) a campaign avatar data field 308B (which may comprise a pointer or identifier of a data file which defines information customizing the user's avatar for a particular campaign, such as a uniform or other insignia identifying the third party organization of the campaign, which is to be added to a default depiction of the user's avatar which is not specific to any particular campaign); (v) a custom online portal URL field 310B (which stores an address or other identifier of a custom online portal created for a user, an example of which is illustrated in FIG. 6); (vi) an avatar location field 312B, which stores a file or identifier of a file defining data for a personalized virtual location in which the user's avatar may be depicted (e.g., a personalized virtual room or locker, an example of which is illustrated in FIGS. 8A, 8B and 8C); (vii) a campaign status field 314, which indicates a status of the campaign or user's participation in the campaign (e.g., whether the campaign is active, will begin on a certain date or has ended); (viii) a sales goal/current field 316 which stores an indication of a sales goal and the current total in sales achieve (of course, different goals may be stored or represented and the sales goal/current data may be represented in a different manner, such as percentage of goal achieved thus far); (ix) a group identifier field 318B, which stores an identifier of a group affiliated with the third party organization of the campaign of which the user is a member (e.g., a class of a school if the third party organization is a school, a troop number of a scouting organization if the third party organization is a scouting organization, etc.); (x) a group image identifier field 320B, which may store an identifier, link or data file of a group image of the user's avatar and the avatar's of other users associated with the user (an example of which is illustrated in FIGS. 8 and 9, respectively); (xi) an award A status field 322B, which indicates whether a user has earned a first award (virtual or real world) available by meeting one or more criteria of the campaign; (xii) an award B status field 324B, which indicates whether a user has earned a second award (virtual or real world) available by meeting one or more criteria of the campaign (although only two awards are illustrated via fields 322B and 324B, any number of awards may be available for earning by the user); (xiii) a message identifier field 326B, which stores an identifier, link to or data file for a personalized message provided by the user for use in creating customized marketing content (e.g., for inclusion in an e-mail to recipients and/or for output via a customized online portal); (xiv) a personal video identifier 328B, which stores an identifier, link to or data file for a personalized video uploaded by the user for use in creating customized marketing content (e.g., for inclusion in an e-mail to recipients and/or for output via a customized online portal); (xv) recipient identifiers field 330B, which stores an identifier (e.g., which is a key field for a record which stores additional data for each such recipient, such as a nickname and e-mail address) for each recipient to whom the user would like to have customized marketing content promoting his/her participation in this particular campaign (it should be noted that the recipients listed in field 330B may be all or a subset of the recipients listed in field 310A of record 300A); and (xvi) login credentials field 332B, which stores credentials (e.g., a username and password) for allowing access to the data defining a user's participation in a particular campaign and allows the person (e.g. the user, guardian of the user or leader of a group of the user) to view or modify such data (e.g., to modify a sales goal, upload a video for use in a customized online portal, customize an avatar for use in promoting the campaign by the user, etc.).

The example record 300B illustrated in FIG. 3B further includes an Associated User(s) field 334B. This field stores identifiers of other users with which the user who is the subject of this record is associated with. For example, these may be the uses who also belong to a particular group which is participating in the current campaign (e.g., a particular class, sports team or scouting group). The user identifiers stored in field 334B may be, for example, provided by the user or another person affiliated with the user (e.g., a leader of the group of which the user is a member) or may be determined automatically based on the group identifier stored in field 318B or based on other data. In one embodiment, if a group is participating in a campaign of a third party (e.g., a particular class is participating in a fundraising campaign of a sports club or a particular troop is participating in a fundraising campaign of a scouting organization), a group leader may access the system of a User Fundraising Service (e.g., system 200) and provide an indication of each user who is a member of the group by associating the members with the group identifier of the group (which, in some embodiments, may be generated by the system or provided by the leader (e.g., such as a troop number)). Thus, the members of the group may be associated with one another via a group identifier of the group. The identifiers of other users associated with a particular user may be used in some embodiments to updated data or content. For example, in one embodiment a group image or photo may be generated the system, the group image or photo including an avatar (or other representation) for each user of the group who has created a customized avatar (and, in some embodiments, an avatar or other representation of the leader). Respective examples of such group images or photos are illustrated in FIGS. 8 and 9. Thus, the user identifiers of users associated with the user may be utilized by the system 200 to determine whether a group image or photo should be updated (e.g., based on a creation or modification of another associated user's avatar). In some embodiments, such a group image or photo is updated dynamically (e.g., as new information relevant to the group image or photo is received by the system) while in other embodiments it is updated periodically or at the request of the user or another authorized person (e.g., a leader of the group). The user identifiers of other users associated with the user may also be utilized for other purposes (e.g., to share the user's earning of awards or other accomplishments with the other users).

In accordance with some embodiments, the data stored in record 300B may be utilized to create or update marketing content for a user in furtherance of the user's participation in a particular campaign of a particular third party organization. For example, the data in campaign avatar data field 308B may be utilized to further personalize a user's default avatar (e.g., as identified in the avatar identifier field 306B) for a particular campaign. The campaign-specific avatar (e.g., wearing the uniform or other insignia of the third party organization associated with the campaign) may then be output in a customized online portal which also includes the personalized message and personalized video identified in fields 326B and 328B, respectively. An e-mail message including the campaign-specific avatar may then be output to the recipients identified in field 330B. As at least some of the recipients visit the personalized online portal identified in the e-mail message and make purchases, the current sales in field 316B may be updated and data output in the customized online portal may be updated based on such additional sales data as well.

Figure 4:
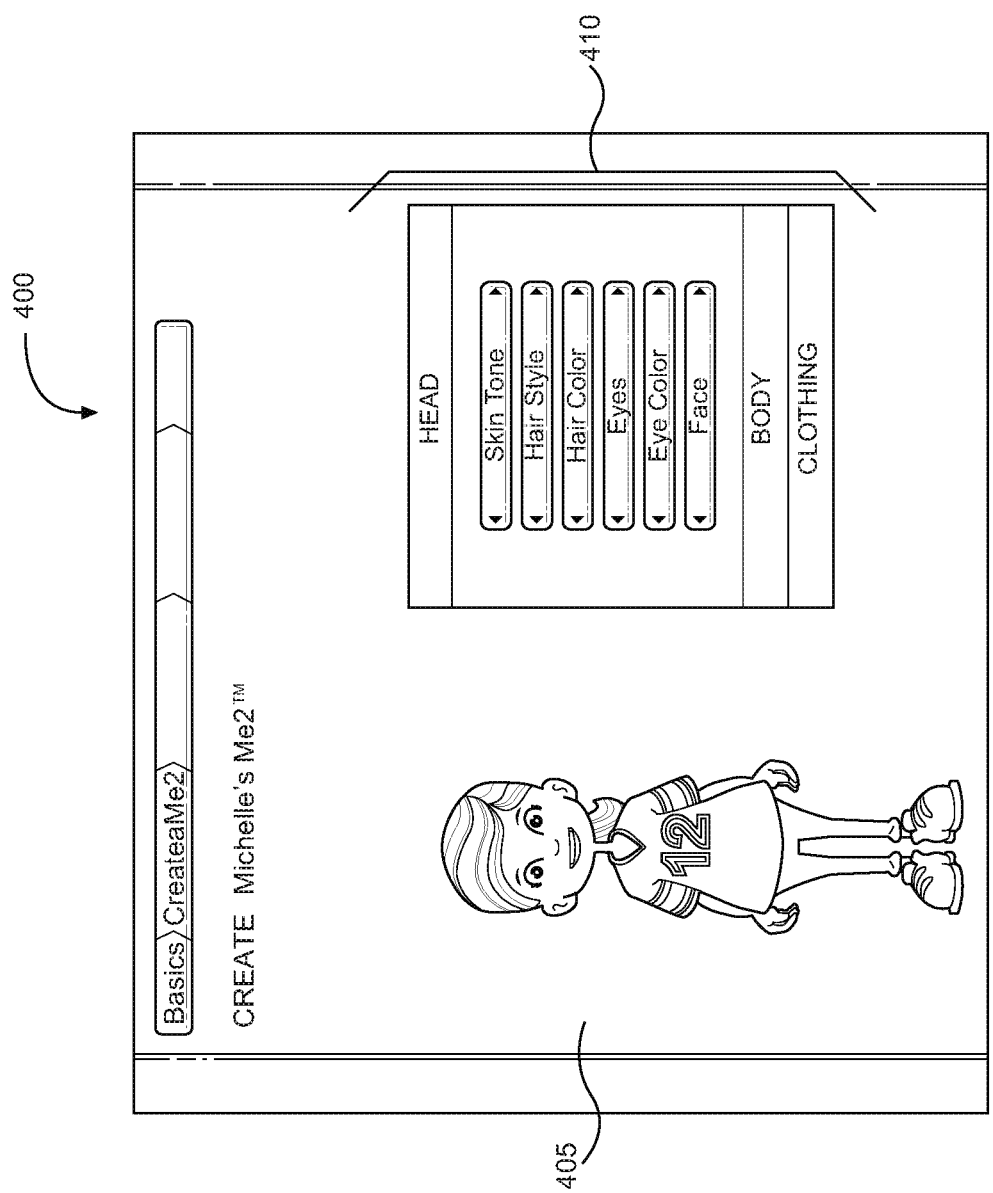
FIG. 4 comprises one example embodiment of a web site interface for facilitating one or more embodiments described herein.

Referring now to FIG. 4, illustrated therein is an example user interface 400 which may be output to a user for facilitating the generation of a customized avatar to represent a user. The term "avatar" as used herein unless indicated otherwise, may refer to a graphical representation, likeness or caricature of a user. An avatar may in some embodiments comprise an entire body representation of the user (e.g., not just a representation of a head and face of a user but also the body of the user, including apparel), although for some applications only the neck-up portion of an avatar may be shown (e.g., in a social media share, such as a graphic accompanying a Tweet™). An avatar may be two dimensional or three dimensional, static or dynamic. An avatar, may, for example, represent an alter ego or character of the user. The embodiments described herein are not limited to representations of a user which may be considered avatars. Other representations of a user may be utilized while remaining within the spirit and scope of the embodiments. For example, a photo or drawing of a user (or other image representing the user) may be utilized in some embodiments.

The user interface 400 may comprise, for example, a user interface of a User Fundraising Service, for allowing a user to make selections for creating a customized avatar to represent the user. The user interface 400 comprises a menu of user selectable choices 410 for customizing an appearance of an avatar, such as the head of the avatar (e.g., skin tone, hair color, hair style, etc.), the body (e.g., height, shape) and the apparel or clothing (e.g., color or style of a jersey or other type of uniform). The user interface 400 further comprises a depiction of an avatar 405, such as may result from making selections in the menu 410. The avatar 405 may comprise, for example, a default avatar and/or an avatar the appearance of which is modified in real time as the user selects options from the menu 410.

In some embodiments, an aspect of the appearance of an avatar created for a user may be based on information other than selections from a menu of options such as depicted in menu 410. For example, if the user is a member of a sports team, the color or style of jersey of the avatar may be automatically selected or determined based on information the user provides (e.g., based on the meta-data stored for the campaign which the user indicates he/she is currently participating in). For example, the user may be provided an opportunity to indicate which campaign the avatar is to be used for (or being created in support of) and the meta-data of the campaign (such as may be stored in a campaign meta-data record 208) may be accessed to determine the appropriate apparel of the avatar. In a more particular example, the number to be included on the jersey of the avatar may be determined based on information stored in a user account data record 206, campaign meta-data data record 208 or in another storage location. In another more particular example, if the user is a scout participating in a campaign for a scouting organization, the den or troop number of the user's scout group may be automatically determined and included on the uniform of the avatar based on information the user provides. In some embodiments, the user may be provided with an opportunity to purchase, qualify for or obtain customized merchandizing based on the customized avatar created for the user (e.g., a plush doll, coffee mug, mouse pad, tote bag, etc.).

In some embodiments, as described above, the apparel of an avatar may incorporate personalized items, such as team or school colors (e.g., if the avatar is being used in a campaign for the team or school). Other examples of how an avatar may be personalized include logos, brands, sports or band equipment (or other organization propos or equipment, such as chess pieces or awards for chess club, costumes for school plays, etc.). In some embodiments, the Fundraising Server 110 may need to obtain permission or a license from a third party (e.g., a brand or logo owner) in order to offer apparel or other virtual items for personalizing an avatar that include the proprietary information, brands or logos of that third party. For example, in an embodiment in which a school or PTA/PTO of a school organize a fundraising campaign, the school or PTA/PTO may upload images, graphics or other files (e.g., logos) of the school for use by users who participate in the fundraising campaign in customizing their avatars and thus provide permission to the Fundraising Server 110 to facilitate use of such images, graphics or files.

In some embodiments, there may be opportunities for a third party organization that is the beneficiary of a campaign to realize additional financial support or funding by selecting a sponsor organization to be associated with the campaign. The sponsor organization may comprise, for example, a provider of sports or other apparel or equipment relevant to the campaign. For example, a sponsor organization may agree to donate to the third party organization campaign or provide another benefit to the third party organization (e.g., provide prizes to use as rewards for users for meeting goals of the campaign) if the users participating in the campaign add a logo or brand name of the sponsor organization to their avatar or avatar's virtual room. For example, a sports apparel brand such as Under Armour™ may provide free Under Armour™ t-shirts as rewards for meeting sales goals if minimum number of users in a campaign add a t-shirt or hat with the Under Armour™ name and/or logo to their avatar as it is used in marketing messages during the campaign. In one embodiment, an organizer of a campaign may be presented with one or more options of available sponsors for a campaign they are organizing via the Fundraising Server 110. For example, the Fundraising Server may store and output via a user interface to the organizer a menu of available sponsors and the attendant benefits, requirements and other terms of each such sponsor for being affiliated with a campaign.

In some embodiments, a data file (e.g., an image file and/or file storing the choices made by the user in customizing the avatar) may be stored in association with the user. For example, an identifier for uniquely identifying the avatar created for the user based on the choices made by the user may be generated and stored in association with the file and stored in a user account data record of the user. In some embodiments, the avatar created for the user based on the choices made by the user via menu 410 may be utilized or included in various marketing content for a campaign the user is participating in (e.g., in e-mail messages sent on behalf of the user, in a customized online portal created for the user, in a group image of the user's avatar and the avatar's of other users associated with the user, etc.).

Figure 5:
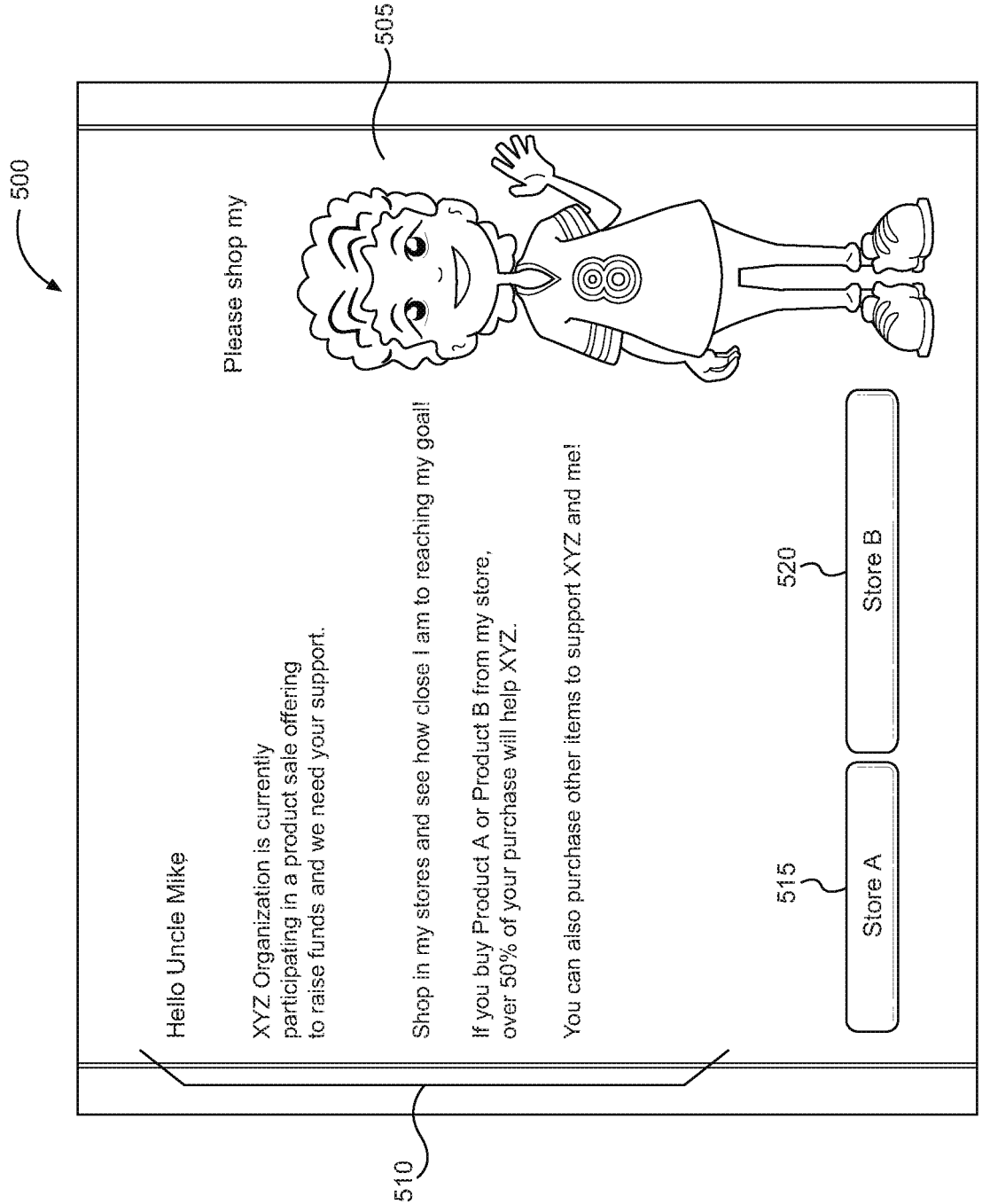
FIG. 5 comprises one example embodiment of a web site interface for facilitating one or more embodiments described herein.

Referring now to FIG. 5, illustrated therein is an embodiment of an example user interface 500, which may comprise an example marketing content (embodied, for illustrative purposes only, as an e-mail message or a message which may appear on a web page associated with the user), which message may be generated by a User Fundraising Service (e.g., via system 100 of FIG. 1 or system 200 of FIG. 2) on behalf of a user. In accordance with some embodiments, the marketing content may be generated using information provided by the user and information provided by the third party organization which the user is supporting. For example, the marketing content may include a customized avatar 505 the appearance of which is customized based on data received from the user (e.g., based on selections of the user via an interface such as interface 400) and data received from the third party organization (e.g., uniform information and logos provided by the third party organization). The marketing content may, in accordance with some embodiments, further include a personalized message 510, which may include a respective personalized salutation each recipient to whom the marketing content is transmitted or output. For example, in one embodiment a user may provide to the service names and contact information (e.g., e-mail addresses) for each of a plurality of friends or family members to whom the user desires to send an e-mail or other personalized marketing content (a plurality of recipients).

The marketing content may further be personalized with (i) the name of the third party organization on behalf of which the user is trying to raise funds and/or awareness; (ii) an indication of the product(s) the user is trying to sell in order to raise funds for the named third party organization (e.g., all or a portion of the proceeds from the sales of the specified products may be provided to the named third party organization); and (iii) links to one or more personalized "storefronts" or web pages (illustrated via links 515 and 520 in user interface 500) via which the recipient of the marketing message may purchase the specified products in order to help the user raise funds for the third party organization. For example, in one embodiment a link to a personalized storefront such as the link 515 may cause a personalized web page to be opened in the recipient's browser, which web page allows the recipient to purchase one or more products in support of the campaign being promoted by the user in the personalized message 510.

As can be appreciated from the embodiment of user interface 500 and other embodiments described herein, a User Fundraising Service as described herein may function to facilitate sales of products on behalf of the user (e.g., provide an interface on the user's online portal via which individuals may place products into a shopping cart, provide payment, specify shipping instructions, etc.). In some embodiments, the User Fundraising Service may facilitate the collection of payments and disbursement of payments to one or more third party organizations for any given sale (e.g., in some embodiments a portion of each sale may be provided to the third party organization for which the user is raising funds, another portion may be provided to the user or a local office or sub-group of the third party organization (e.g., a troop or den of a scouting organization, etc.).

In one embodiment, the marketing content illustrated in FIG. 5 may comprise an e-mail message which is output to a plurality of recipients specified by the user (e.g., friends and family members comprising the user's personal network). The e-mail message may be, for example, output by the User Fundraising Service (e.g., via the services of another entity specializing in mass e-mail messaging) on behalf of the user. Alternatively, the e-mail message may be transmitted to the user or another person associated with the user (e.g., a coach of the user's sports team or a leader of the user's scouting group) for forwarding by the user to desired recipients.

Turning now to FIG. 6, illustrated therein is an example user interface 600 which comprises a web page of a customized online portal generated by a User Fundraising Service on behalf of a user, via which web page viewers are enabled to purchase products in order to help raise funds for a specified third party organization. In accordance with some embodiments, the user (or a group with which the user is associated, such as a troop or den of a scouting organization, which may be a subsidiary of or group within the third party organization) may benefit from such purchases by receiving a portion of proceeds from such purchases, in addition to the third party organization receiving a portion of such proceeds. In accordance with some embodiments, the User Fundraising Service may receive payment from the third party organization from aiding such purchases via the creation of customized online portals for users affiliated with the third party organization. Such payment may be in the form of a portion of the proceeds from the sales, a flat fee payment for the services provided or another form of payment.

It should be noted that an online portal (or customized online portal), as the term is used herein unless indicated otherwise, may refer to a website or set of web pages, associated with a user and designed to promote the user's efforts to promote a campaign of a third party organization, by soliciting sales, donations or pledges via the one or more web pages comprising the customized online portal. In accordance with various embodiments described herein, an online portal is designed by a User Fundraising Service (e.g., via system 200 of FIG. 2) using content received from a user (e.g., text, images, graphics, information, videos, etc. provided by the user as it relates to the user and/or the user's interest in, or reasons for, promoting the third party organization) and content received from or related to the third party organization (e.g., the name of the organization, a trademark or logo of the organization, products available for sale from or on behalf of the organization, links to information or products, etc.). In accordance with some embodiments, the online portal may be a mechanism for an individual (e.g., an individual invited to do so by the user for whom the online portal was created or customized) to support a third party organization at the request of the user by making purchases, donations or pledges for the benefit of the third party organization, the user and/or a group with which the user is affiliated (e.g., an affiliate, subsidiary or group within the third party organization, such as a class in a school, a team of a sports club or a troop of a scouting organization).

In accordance with some embodiments, the user interface 600 may comprise a web page of a customized online portal which comprises a personalized "online store" web page to which a recipient is directed when clicking on a link in a personalized message from the user (e.g., a link included in user interface 500 of FIG. 5). In accordance with some embodiments, the user interface 600 is customized with (i) a personalized video which may be initiated via area 605 (this may be a default video if the user chooses not to upload a personal video); (ii) a photo or image of the user in area 610 (this may be an image of the user's avatar in some embodiments); (iii) a personal message from the user in area 615; (iv) choices of products in areas 620 and 625, which may comprise links or functionality via which the recipient or viewer may request more detailed information on particular products being sold and/or purchase such products (e.g., selecting a representation of a product may cause one or more additional web pages or dialogue box to be output, via which the user may place selected product(s) in a virtual shopping cart and provide credit card or other payment for the selected product(s)). In other words, the user interface 600 may include or support a shopping cart function which allows an individual to purchase the one or more available products (e.g., provide payment, provide shipping information, etc.).

In accordance with some embodiments, the user interface 600 may depict one or more products selected by the user as ones to be highlighted, emphasized or promoted via the user interface. For example, assuming there is a set of products available for sale by the user on behalf of the third party organization, the user may in some embodiments be allowed to select a subset of such products to be promoted or placed in a designated area of the user interface 600 (e.g., such as illustrated in area 625), to bring attention to such products. In some embodiments, such a subset may be selected for the recipient or viewer of the user interface 600 (e.g., assuming the products being sold are magazines, based on the viewer's location a magazine specific to a particular geographical area may be selected, or based on the viewer's interests a magazine specific to a hobby or activity may be selected). In one embodiment, the user for whom the customized online portal embodied in interface 600 may be provided an opportunity to indicate a product the user particularly likes (e.g., for him/herself) so that visitors to the online portal may recognize that the user particularly likes the product (and, for example, purchase the product for the user or themselves). It should be noted that although the products illustrated as being sold are magazines, the embodiments described herein are not limited to any particular products or types of products (and, as described herein, that pledges or donations may be requested in lieu of or in addition to purchase of products).

Figure 7:
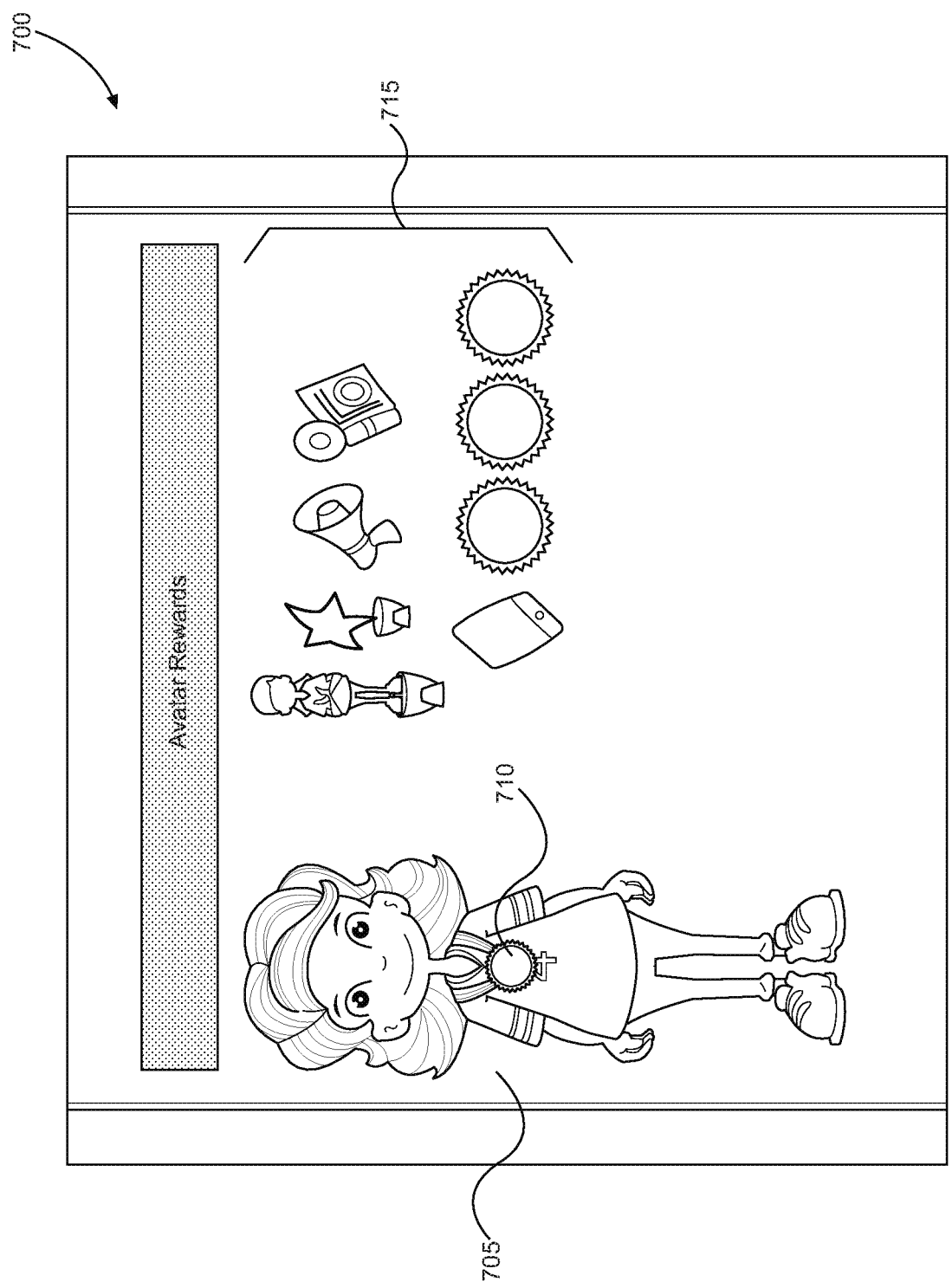
FIG. 7 comprises one example embodiment of a web site interface for facilitating one or more embodiments described herein.

Referring now to FIGS. 7, illustrated therein is an example user interface 700 which depicts a web page via which a user may view his customized avatar and the virtual awards the user has earned or may earn. In accordance with some embodiments, a user may earn awards which may be represented via medals or other insignia which may be depicted on the user's customized avatar (e.g., on a uniform of the avatar or otherwise as worn by the avatar) and/or trophies or other representations of awards which may be depicted in a virtual location in which the avatar is depicted (e.g., in a virtual room, locker, sports venue or other location). In accordance with some embodiments, a user may earn a virtual award (e.g., an award depicted as an insignia on the user's avatar or in the virtual room of the avatar but which has not monetary or tangible value) based on actions of the user in providing content for the user's online portal or otherwise facilitating the user's marketing efforts to contribute to the campaign of a third party organization. For example, a user may earn a video camera badge or trophy for his avatar by uploading a video for use in the user's online portal. Providing such virtual awards may, at little or no cost to the third party organization or other entity, incentivize the user to further customize his/her marketing efforts. This may increase the success of the user's contribution to the campaign of the third party organization. In some embodiments, an embodiment of an award or insignia provided to the avatar (or in the avatar's virtual location, such as if the award comprises a trophy, medal or other award which may be displayed in the virtual location) may be customized or based on an interest or preference of the user (e.g., pets or animals, sports, arts and crafts, medieval times, etc.).

In some embodiments, a user may earn virtual awards by meeting one or more goals of the campaign (e.g., as set out in the meta-data record defining the campaign). For example, in one embodiment a user or other entity (e.g., the third party organization or a leader or coach of the group with which the user is affiliated) may specify a goal. For example, the goal may comprise a monetary value in sales to be achieved or a number of products to be sold. The user may earn awards based on progress towards the goal (e.g., the user may earn a bronze medal for his/her avatar once 25% of the goal is satisfied, a silver medal once 50% of the goal is satisfied and a gold medal once 100% of the goal is satisfied). In some embodiments, a user may also earn monetary or tangible awards (e.g., prizes such as products, discounts, tickets to events, etc.) based on progress towards satisfying the goal. In some embodiments, an indication of such awards and/or progress towards such awards may be represented and/or updated in user interface 500 (e.g., marketing content output to recipients in the form of an e-mail message encouraging purchases), user interface 600 (e.g., a web page comprising a customized online portal), user interface 800 (depicting the user's avatar in personalized virtual location) or elsewhere (e.g., in an e-mail message transmitted to the user and/or a leader or coach of a group with which the user is affiliated).

User interface 700 illustrates one example interface via which a user may view his avatar, the awards earned for wearing by the avatar and additional awards which may be won for wearing by the avatar or for representation in a virtual representation of the avatar. For example, the avatar 705 is depicted as having earned a virtual medal 710 and area 715 illustrates a plurality of additional virtual awards which may be earned for the avatar (or the avatar's virtual location) by the user. In some embodiments, each of the awards depicted in area 715 may be accompanied by an explanation of the one or more criteria for earning the associated award.

Referring now to FIG. 8A, illustrated therein is an example user interface 800 comprising a customized avatar represented in a virtual location comprising a virtual room, which virtual room is personalized with content relevant to the user and/or the avatar. Illustrated in the virtual room is the user's avatar 805.

Also illustrated in the virtual room is a group image 815 (which in some embodiments may be embodies as a photo, caricature or other representation) of the user's avatar with the avatar's of other avatars created by other users. For example, as described with respect to FIG. 3B and consistent with some embodiments, a group image or photo may be updated based on data associated with other users associated with the user who is the subject of the user interface 600 and user interface 800. In one embodiment, a group of users may cooperate to earn a group award (e.g., by achieving a total in sales goal for the group) and an earning of such a group award may be depicted in a group image or photo.

In one embodiment, when a user logs in to a web page such as depicted in the user interface 800, the system may check to determine whether new avatar data is available for the group image 815 (e.g., whether additional associated users have created customized avatars, modified the appearance of their avatars or earned awards which should be depicted in the appearance of their avatars or whether a group award has been earned). If new data is available, the system may updated the group image 815 based on such data. In other embodiments, the group image is updated dynamically or periodically and not in response to a user logging in to a user interface which outputs such group image. For example, the group image may be stored in a file (e.g., as identified in field 320B of FIG. 3B) and a process of the system 200 may periodically or dynamically (e.g., as new relevant data becomes available) update the file, which is then accessed and utilized in the interface 800 when the user logs in to the relevant web page. In accordance with one embodiment, the representation of group image 815 may comprise a link to another (e.g., larger or more detailed) version of the group image, which the user may view by actuating or selecting the link comprising group image 815.

In accordance with some embodiments, the virtual location of user interface 800 further comprises an area 820 for depicting awards earned (or earnable) by the user, awards which are not worn by the avatar of the user. In the non-limiting example of FIG. 8, such an area 820 is depicted as a trophy shelf or cabinet depicting trophies, awards or other representations of achievement earned (or earnable) by the user. As described herein, such awards may be virtual (and, in some embodiments, have a real-world counterpart, such as a prize which is mailed or otherwise provided to the user) and may be earned by satisfying goals of the fundraising campaign and/or performing qualifying activities of customizing the online portal of the user. The area 820 illustrates several award earned by the user of avatar 805. The awards illustrated with a "question mark" over them are awards which the user may earn but has not yet earned (of course other embodiments of illustrating available but not yet earned awards may be utilized).

In accordance with some embodiments, a virtual location such as that illustrated in user interface 800 may be further customized by or for a user. For example, the virtual location may be illustrated based on content (e.g., decorations) and in colors or themes preferred by the user. In accordance with one embodiment, the user's name is prominently displayed in area 810 of the virtual location. In some embodiments, an indication of a group the user is a member of may also be displayed (e.g., the user's team name or troop number). The user interface 800 may be updated, for example, responsive to various achievements of the user, modifications made by the user or another authorized person and/or additional content provided by the user.

In accordance with some embodiments, a user interface such as user interface 800 may be a web page of a user's customized online portal to which access is restricted (e.g., some of the web pages comprising a user's online portal may be for the user's private use and not part of the user's marketing efforts towards his/her personal network). For example, in some embodiments only the user or another authorized person (e.g., the user's guardian or a leader of a group to which the user belongs) may be granted access (e.g., via verified login credentials) to such a web page of the user's customized online portal. In accordance with some embodiments, at least some other types of web pages of a user's customized online portal may be accessible to individuals invited by the user (e.g., friend or family members in the personal network of the user, such as the recipients to which an e-mail or other message soliciting support of the campaign). For example, the user may transmit (or authorize the transmission of) an e-mail or other marketing message to such individuals, inviting them to visit the one or more pages of the online portal (e.g., in order to purchase products to raise funds for the third party organization). An example of such an e-mail message is illustrated herein in FIG. 5. In accordance with some embodiments, web pages to which such individuals are invited (e.g., such as the example web page illustrated in FIG. 6) may be accessible only via a pre-authorized URL link (e.g., a link in an e-mail generated for purposes of inviting such individuals, such as link 515 or 520 of FIG. 5) and/or via a password or other login credential. Such limited access may be desirable to provide privacy to the user.

Referring now to FIG. 8B, illustrated therein is the user interface 800 similar to that illustrated in FIG. 8A, but with the group image 815 being different in that there is an additional avatar 815a added to the group image 815. It should be noted that the avatar 815a is depicted in a faded fashion relative to the other avatars in the group image 815, in accordance with embodiments described below. In accordance with some embodiments, another user's avatar (i.e., an avatar of a user that is not the user who is the subject of the user interface 800, such as an avatar of a team member or troop member with the subject user) may be added to the group image upon a predetermined condition being satisfied. The predetermined condition may be set, for example, by a group organizer (e.g., troop leader, team manager, etc.) that organizes a fundraising campaign. Examples of predetermined conditions include, without limitation: (i) a minimum sales value; (ii) a minimum number of items sold; (iii) a minimum number of e-mails sent by the user to solicit sales towards a fundraising goal; (iv) a minimum number of responses to a user's sales efforts (e.g., a minimum number of "click-throughs" from recipients who received an e-mail from the user that includes a link to the user's customized online portal); and (iv) a minimum activity level by a user with respect to setting up a personalized online portal and/or a personalized avatar (e.g., the user has to select the characteristics of his/her avatar, such as described with respect to FIG. 4). In accordance with some embodiments, once a user has satisfied the one or more predetermined conditions for having his/her avatar added to a group image associated with the user (or associated with a team or group that the user is a part of), that user's avatar may be added to the group image as it may be output in a user interface 800 of each user associated with that group or team. Thus, for example, assuming that the user who is the subject of the user interface 800A of FIG. 8A and FIG. 8B is a member of the same group as the user whose avatar is represented as avatar 815a (referred to as user 815a herein) in group image 815, it may be assumed that in the circumstances being depicted in FIG. 8A the user 815a has not yet satisfied the one or more predetermined criteria for having his/her avatar added to the group image and thus group image 815 of FIG. 8A does not include avatar 815a.

In some embodiments, rather than it being a binary yes/no determination of whether a user's avatar should be added to (or remain included in) a group image, a user's avatar may be progressively faded in/out or progressively made more/less intense, bright, clear, revealed, transparent or otherwise discernable in a group image over time or over a series of events based on the user's activities (or activities attributable to the user, such as purchases made by persons associated with the user). For example, a group image may initially not include a particular avatar of a user who has not satisfied at least one predetermined criteria for having the user's avatar included in a group image (or the group image may initially include a relatively faded, transparent, low intensity or obscured version of the user's avatar). Then, as the user's activities bring the user closer to a goal or closer to satisfying at least one predetermined criteria, the avatar of the user may be made darker, more intense, brighter, clearer or sharper in the group image.

In another embodiment, a user's avatar may initially be shown in a group image as not faded or in a relatively sharp, intense or bright manner but may then be rendered more faded, transparent, less intense, less sharp or less bright over time if the user does not satisfy at least one relevant predetermined criteria. For example, if a user does not achieve at least X in sales within a predetermined period of time or does not send an e-mail with a link to the user's customized online portal to at least X persons within a predetermined period of time, the image of the user's avatar may be rendered more faded, more transparent, less bright or less intense within a group image. In some embodiments, a user may be given a grace period within which to satisfy the at least one relevant predetermined criteria and thus result in the user's avatar becoming less faded, less transparent, more bright or more intense.

Referring again to FIG. 8B, illustrated therein is the user interface 800 of FIG. 8A but with the avatar 815a illustrated in group image 815 in a relatively faded format. The faded format of the avatar 815 may indicate, for example, that the user 815a has not yet satisfied the relevant predetermined criteria for having her avatar included in the group image 815 but has begun to do so (or, alternatively, that the user's avatar is in danger of being faded out from the group image because the user 815a has not yet satisfied at least one predetermined condition within a predetermined period of time).

Referring now to FIG. 8C, illustrated therein is the user interface 800 of FIGS. 8A and 8B, but with the group image 815 including the avatar 815a being depicted in the same brightness or line color as the other avatars in the image. This may indicate, in one embodiment, that the user 815a has fully satisfied the at least one predetermined criterion for having her avatar included in the group image 815. In another embodiment, this may indicate that the user 815a is not yet in danger of having her avatar faded out or removed from the group image 815a.

Thus, in some embodiments users may be rewarded with achieving one or more predetermined criteria by having the user's avatar added to a group image. In an alternate embodiment, a user's avatar may initially be shown as part of a group image representing a group participating in a fundraising campaign but if the user fails to satisfy one or more predetermined criteria (e.g., within a predetermined period of time), the user may be penalized for this by having his/her avatar removed from the group image. In some embodiments, a user who has been penalized by having his/her avatar removed from a group image may be afforded an opportunity to have the avatar returned to the group image by being given a grace period within which to satisfy the at least one predetermined criteria and/or being given an alternate at least one predetermined criteria to satisfy (e.g., you did not achieve at least $X in sales within the last week so your avatar has been removed from the group photo but if you send 10 more e-mails promoting this fundraiser then your avatar will be returned to the group image).

In some embodiments, it may be certain parts or portions (e.g. body parts or uniform parts) of a user's avatar that are rendered as less/more faded or even removed from the group image (as opposed to fading the entire avatar). For example, if a user fails to satisfy at least one predetermine criteria, an arm of the avatar may be removed or a patch on the avatar's uniform or other clothing may be removed. Similarly, in embodiments in which users are rewarded with a more intense or complete avatar for satisfying one or more predetermined criteria, an arm or other body part may be added to a user's avatar as the user gets closer to satisfying the one or more predetermined criteria (such that the whole avatar is represented only once the user fully satisfies the one or more predetermined criteria).

It should be appreciated that embodiments in which a user's avatar may be faded in or out of a group image (or to have his/her avatar otherwise removed, added to, obscured or unobscured from a group image), based on a satisfaction of at least one or more predetermined criteria, may exert a certain pressure or incentive on the user to satisfy the one or more predetermined criteria in order to have his/her avatar preserved in or added to the group image. Even if the user does not realize that his/her avatar is in danger of being faded out of a group image (or has not yet been added or fully added to a group image), the other users in whose virtual rooms the group image appears may communicate with the user to let him/her know this and encourage him/her to perform activities to add or preserve the avatar in the group image. In some embodiments, the Fundraising Server 110 may provide a mechanism via which group members or participants in a particular campaign may contact a particular user to warn him/her about the status of his/her avatar vis-à-vis a group image. For example, the Fundraising Server may allow a first user to send an e-mail, instant message or text message to a second user whose avatar is faded or not present in a group image (or post a message on the second user's customized online portal), alerting the second user as to the status of his/her avatar vis-à-vis the group image (and, in some embodiments, include a copy of the group image showing the status of the second user's avatar).

Referring now to FIG. 9, illustrated therein is a user interface 900 which depicts a group image comprising a representation of the user's avatar along with the avatar's of other users with whom the user is associated. For example, the group image of FIG. 9 may comprise an image of the user's avatar along with the avatars of other members of the user's sports team, class, scouting group or other community or work group who have also customized an avatar. In the example of FIG. 900 the group image depicts just the "head shots" of each avatar but in other embodiments a partial or full body view of each avatar may be represented. In some embodiments, a group image of a representation of the user and representations of other users associated with the user may comprise photo images, caricatures, silhouettes or other representations rather than avatars. As described herein, a group image of a representation of the user along with representations of other users associated with the user may be output in a web page (e.g., a restricted access web page) of the user's customized online portal. Similarly, a web page of a customized online portal of one of the other associated users may include a group image which includes a representation of the user. In some embodiments, any user a representation of whom is to be included in a group image may need to provide permission before the representation is included in the group image. In some embodiments, a group image such as that illustrated in FIG. 9 may comprise additional functionality allowing the user to communicate with the other users by use of the group image. For example, the group image may include functionality such that clicking on a representation of one of the other users would allow the user to send a communication (e.g., an e-mail, a text message, a posting to a social media site or an instant message) to the other user depicted in the representation. In some embodiments, a user may be allowed to modify the group image (e.g., the user may be allowed to highlight or add labels to representations of individual users in the group image).

In accordance with some embodiments, a processor or system (e.g., system 200 of FIG. 2) may be operable to facilitate a first user's efforts to support a third party organization by (i) determining a first user associated with a group of users which is participating in a fundraising campaign for a third party organization; (ii) creating a first personalized graphical representation of the first user based on information received from the first user, thereby creating a first user graphical representation; (iii) determining a second user who is also associated with the group; (iv) determining that a personalized graphical representation of the second user has been created for the second user based on information received from the second user, thereby determining a second user graphical representation; (v) generating a group image which includes the first user graphical representation and a second user graphical representation; and (vi) outputting to the first user, via a web page, the group image. In some embodiments, the processor or system may be further operable to (i) determine a third user who is also associated with the group; (ii) determine that a personalized graphical representation of the third user has been created for the third user based on information received from the third user, thereby determining a third user graphical representation; and (iii) modify the group image to further include the third user graphical representation. In some embodiments, the processor or system maybe further operable to (i) determine a change in data associated with the first graphical representation; and (ii) modify the group image to represent the change in data associated with the first graphical representation. The change in data may comprise, for example, an indication that the first user has earned a virtual award for inclusion on apparel included in the first graphical representation. In accordance with some embodiments, the processor or system may be further operable to (i) identify at least one of logo and uniform information associated with the third party organization; and (ii) include the at least one of logo and uniform information in the group image.

Figure 10:
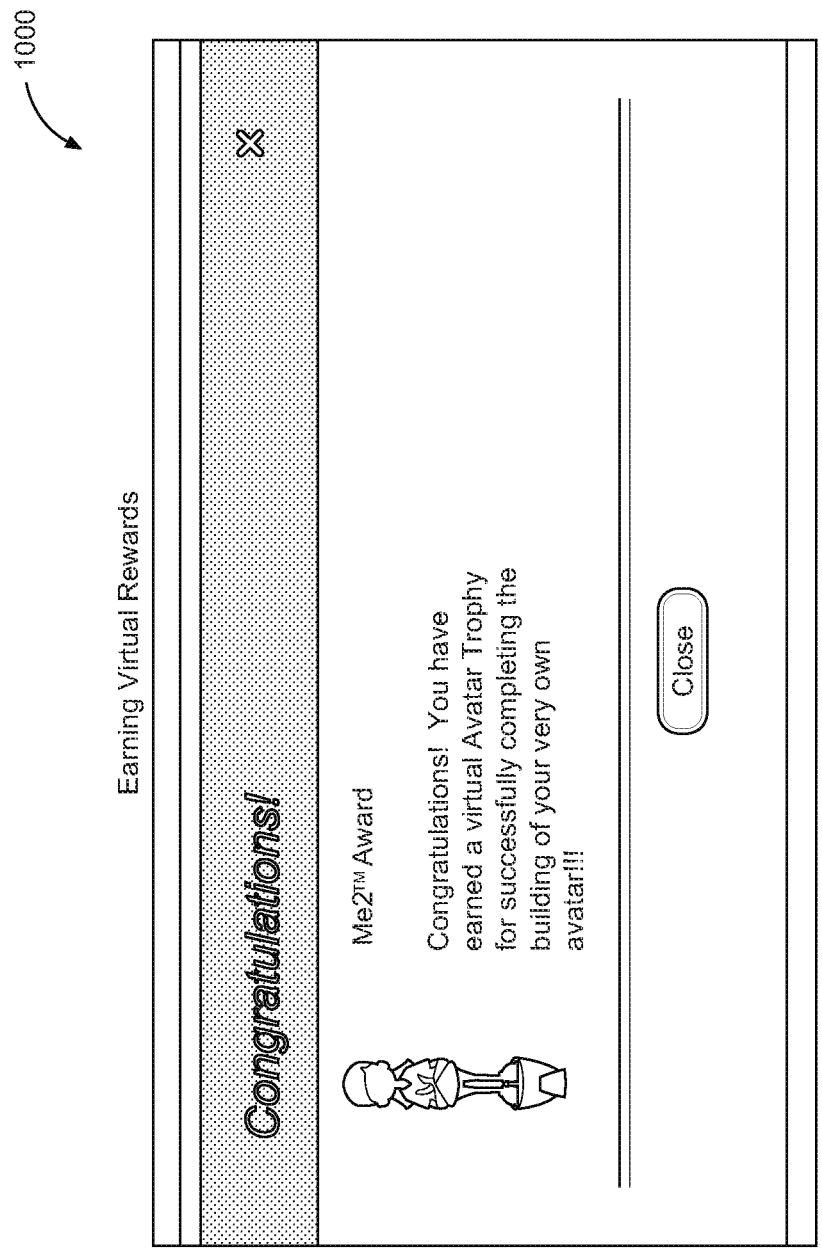
FIG. 10 comprises one example embodiment of a web site interface for facilitating one or more embodiments described herein.

Referring now to FIG. 10, illustrated therein is a user interface 1000, which is an example of an interface which may be output to a user who has earned a virtual award (e.g., in an e-mail message or window which is displayed to the user once the user completes a task qualifying the user for the virtual award or the next time the user logs into his customized online portal). In the particular embodiment of FIG. 10, a message informs a user that the user has earned an "Avatar Trophy" for successfully completing the customization or creation of his own avatar. In some embodiments, the trophy or other virtual award may also be displayed in a virtual location associated with the user (e.g., a virtual locker or virtual room, such as that illustrated in FIG. 8.

Figure 11:
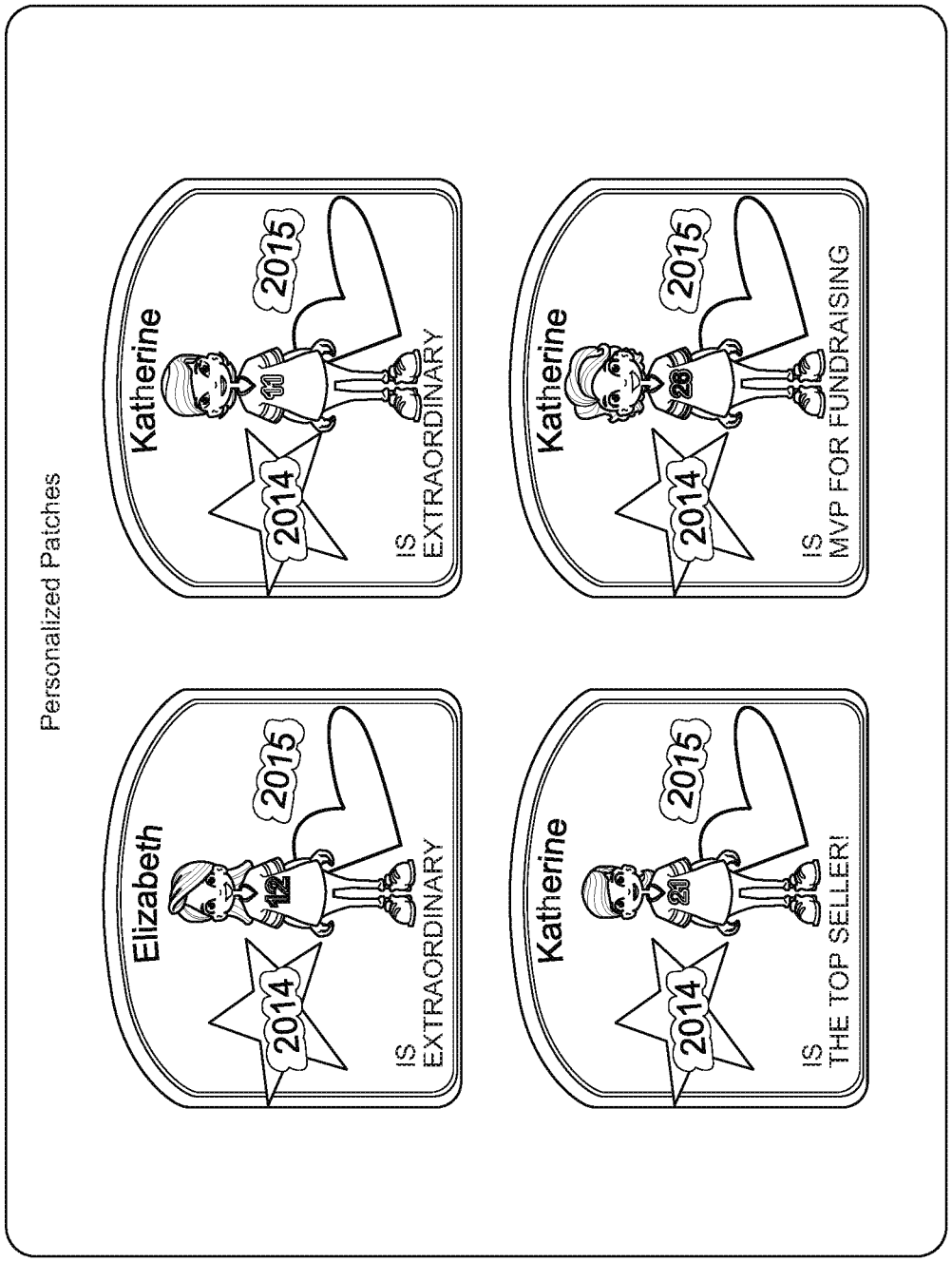
FIG. 11 comprises one example embodiment of personalized merchandise which may be created in accordance with embodiments described herein.

Referring now to FIG. 11, illustrated therein is a user interface 1100, which depicts real world merchandize which a user or other authorized person may order, the real world merchandise being customized with an image of the user's avatar and/or a representation of a group image. In the particular embodiment of FIG. 11, the real world merchandise comprises patches the user may order. But other types of merchandise are contemplated. For example, plush dolls, notebooks, wall posters, mugs, mouse pads, t-shirts and other apparel may be available.

Figure 12:
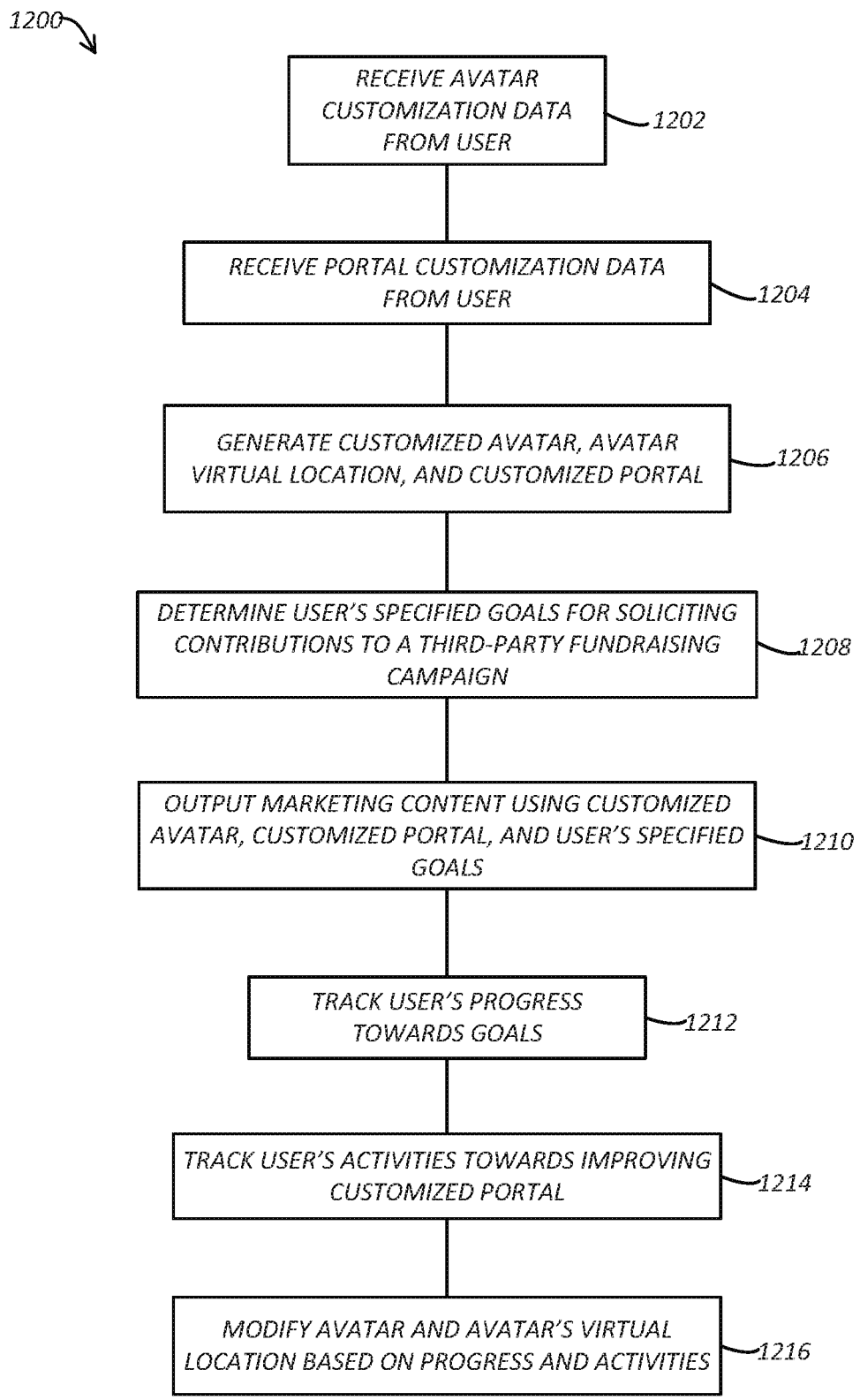
FIG. 12 is a flowchart of an example process consistent with one or more embodiments described herein.

Referring now to FIG. 12, illustrated therein is an example process 1200 which is consistent with one or more embodiments described herein. It should be noted that the process 1200 (and all processes described herein) are exemplary only and should not be construed in a limiting fashion. For example, additional and/or substitute steps to those illustrated may be practiced within the scope of the present invention(s) and in one or more embodiments one or more steps may be omitted or modified. In one embodiment, the process 1200 (or portions thereof) may be performed, for example, by a Fundraising Server 110 (FIG. 1) and/or system 200 (FIG. 2). The process 1200 comprises an example method for facilitating a user's marketing efforts on behalf of a third party organization by performing at least one of the following functions: (i) generating a customized online portal for the user, based on content received from the user and the third party organization, (ii) generating a customized avatar for the user based on information received from the user and, in some embodiments, uniform or insignia information received from the third party organization, (iii) facilitating transactions (e.g., purchases of products or donations) made by individuals in a given user's personal network which benefit the third party organization; (iv) tracking a user's progress in his/her efforts towards contributing to a campaign; (v) tracking, managing and/or transmitting funds collected by each user (or as a result of a particular user's marketing efforts) on behalf of the third party organization; and (vi) generating, transmitting and/or tracking one or more marketing messages on behalf of a given user, distributed (by or on behalf of the user) to specified individuals in the user's personal network to promote a campaign for the third party organization.

Referring now to FIG. 12 in particular, illustrated therein is a process 1200. It should be noted that process 1200 may be preceded by a registration process (not shown) in which a user registers (or is registered) with User Fundraising Service. During such a registration process, a user or another authorized person (e.g., a user's guardian or a leader of a group in which the user is a member) may input some information about the user (e.g., name, group(s) of which the user is a member, contact information for the user etc.). During the registration process the user or other authorized person may provide one or more credentials to, for example, demonstrate that the user is an authorized volunteer or member of the third party organization (or particular group within or affiliated with the third party organization) on behalf of which the user desires to participate in a campaign. For example, in one embodiment an organization which sanctions, authorizes or permits the User Fundraising Service to facilitate marketing efforts by members, volunteers or individuals associated with the organization towards a fundraising or awareness campaign, the organization (or a sub-group, such as a local chapter of the organization, or an affiliate or subsidiary of the organization) may provide certain information which allows the User Fundraising Service to verify that a given user is a legitimate member or volunteer of the organization or otherwise has permission from the third party organization to help in the campaign for the third party organization. For example, in some embodiments a user may be required to provide a predetermined password, code or other identifier prior to being able to partake of the services offered by User Fundraising Service. In another embodiment, the third party organization (or a sub-group, such as a local chapter of the organization, or an affiliate or subsidiary of the organization) may provide to the User Fundraising Service a list of authorized members or volunteers and a user may be required to provide proof of identity to verify that he/she is one of the authorized members or volunteers. In some embodiments, the User Fundraising Service may pass along a request from a user to participate in an ongoing fundraising or awareness campaign of an organization to the organization and only allow the user to proceed if the organization authorizes or verifies the user's request.

It should be noted that a reference to User Fundraising Service herein may, unless indicated otherwise, be applicable or interchangeable with a reference to a fundraising server 110 (FIG. 1) and/or system 200 (FIG. 2) as described herein. For example, when it is described that data or information is provided to User Fundraising Service, it may be interpreted that the data or information is provided to the system 200 (e.g., directly via an input device of the system 200, over a network from a remote device of a user or third party organization or to personnel or an agent of the User Fundraising Service, who may proceed to enter the data or information to the system 200).

Turning now to step 1202 of process 1200, avatar customization data is received from the user. For example, a user may select various options from a menu of different characteristics of an avatar (e.g., such as illustrated in area 410 of FIG. 4). In some embodiments, a user may be provided with software tools for modifying a default avatar's appearance by selecting options or values from a menu. In other embodiments, a user may be provided with software tools for uploading one or more images or graphics for use in customizing an avatar (e.g., an image of the user's face, which may be rendered into a caricature or other derivative representation).

In 1204, online portal customization data is received from a user. For example, a user may provide (i) a textual description, photo or video or other content to be included in the online portal; (ii) one or more goals the user desires to satisfy in participating in the fundraising or awareness campaign (e.g., a financial goal, such as a sales goal); (iii) answers to one or more questions output to the user, to be used in customizing an online portal for the user; (iv) contact information for the user; and (v) contact information for one or more recipients to whom marketing content for the campaign is to be output (in some embodiments a user may have previously input information regarding recipients and may simply select the recipients from a list based on such previous input).

In 1206, a customized online portal, customized avatar and (in some embodiments) a customized virtual location (such as a virtual locker or virtual room) for the avatar is generated by the system. Any and all of the customized avatar, online portal and virtual location may be generated using, for example, the content received in 1204 and content received from or related to the third party organization the user is promoting (e.g., as received and stored in a record of the organization account data records 204, a record of the campaign meta-data records 208 and/or a record of the avatar data records 212, all illustrated in and described with respect to FIG. 2). The virtual location may be generated using the customized avatar and any awards or achievements the user has earned (e.g., in some embodiments the user may earn awards by providing certain content in 1204, such as a personal video to be included in the online portal). In some embodiments, the user may be a member of a local chapter, affiliate or sub-group of the third party organization. In such embodiments, generating the customized online portal and/ or the customized virtual room may comprise including data or information related to one or more other members of the same local chapter or sub-group. For example, in one embodiments a group photo of the user's avatar with avatars of other members of the group who have also provided data to the User Fundraising Service and had a customized avatar generated for them may be generated and included in the virtual location or other content created for the user.

In accordance with some embodiments, generating a customized online portal may comprise including shopping functionality specific to the campaign the user is supporting into at least one page of the online portal. For example, generating the online portal may comprise determining the one or more products being sold during the campaign, including a information about the one or more products in the online portal (e.g., pricing information, payment functionality, a link enabling the viewer to select the product(s) and place them in a virtual shopping cart, etc.). Such product purchase information may be determined, for example, based on information received from the third party organization and/or the user (e.g., in some embodiments the user may recommend or promote certain available products over others).

It should be noted that the information from and/or about a user received in step 1202 and/or 1204 may be received at a different (previous) point in time and later used in step 1206. In some embodiments, at least some of the information received in step 1202 is stored by the User Fundraising Service for subsequent use (e.g., in a record for the user of the user accounts data records 206), in addition to being used to generate the customized avatar, online portal and virtual location.

In accordance with some embodiments, at least one of a customized avatar, a customized virtual location for the avatar and a customized online portal may be persistent or usable by a user for more than one campaign (e.g., for the same organization or for different organizations). For example, in one embodiment the customized avatar and/or the customized virtual location for the avatar may be saved in association with the user or a user account (or at least data used in creating the customized avatar and/or the customized virtual room, such that it may be re-created for the user in a subsequent campaign the user participates in). In one embodiment, an indication of any awards (e.g., virtual trophies, medals and/or insignia worn by the avatar) may be saved and utilized for the user across more than one campaign the user participates in. In one embodiment, the customized avatar, customized virtual location (e.g., including any awards, trophies, medals or insignia earned by the user and represented on the avatar and/or in the virtual location) and/or the customized portal (or any data useful in re-creating any of the foregoing) may be stored by the User Fundraising Service and provided or accessible to the user once a particular campaign has ended. In other embodiments, any of the foregoing data may be stored by a server of another entity on behalf of the user and/or the User Fundraising Service. Similarly, any other data provided by a user in association with a particular campaign (e.g., login credentials, e-mail addresses, preferences) may be saved by the User Fundraising Service and made available for the user to re-use in a subsequent campaign.

In 1208, one or more specified goals of the user for soliciting contributions (e.g., donations, pledges or purchases) to the fundraising or awareness campaign of the third party organization are determined. In some embodiments, such one or more goals may have been received from the user (e.g., in 1204) or another authorized person associated with the user (e.g., a leader of a group with which the user is associated, such as a coach of the user's sports team). In other embodiments, such one or more specified goals may be defined by the third party organization (e.g., an organization may specify one or more goals and corresponding awards for meeting such goal(s), to be applied to all users who help solicit contributions for the organization's campaign).

In 1210, customized marketing content for output to one or more recipients is generated, created or determined using the user's customized avatar, customized online portal and specified one or more goals. Such marketing content may comprise, for example, an e-mail message, a text message and/or a message to be posted on the user's customized online portal or a share to a social media site. In one embodiment, process 1200 may include receiving, from the user, a selection of a marketing channel for the marketing content (e.g., e-mail, posting on social media site, tweet™ etc.) and appropriate credentials for accessing site or posting content to the site on behalf of the user. The marketing content may include, for example, an image of the customized avatar generated for the user, a link to one or more pages of the customized online portal created for the user, and an indication of the one or more goals of the user (and, in some embodiments, the user's progress towards meeting such goal(s)). In some embodiments, such a marketing content may further include a personal message or appeal from the user (which personal message or appeal may, in some embodiments, also be posted on the online portal of the user).

In some embodiments, process 1200 may include creating personalized marketing content for each recipient to whom the user has requested such marketing content be output (e.g., the user may include contact, salutation, demographic or other information about the recipients). For example, if the user would like to have an e-mail message sent to each of (i) his grandmother "Nanny"; (ii) his "Uncle Fred"; (iii) his neighbor "Mr. Smith"; and (iv) his mom's boss "Mr. Brown", a customized marketing treatment may be created for each such individual (e.g., one e-mail may begin "Hi Nanny . . . " while another may begin "Hi Uncle Fred . . . ". In some embodiments, step 1210 may further comprise providing a copy, URL link or rendition of the marketing content to the user, such that the user may personally forward or transmit the marketing content to anyone he/she desires to invite to his customized online portal. In another embodiment, the User Fundraising Service may be operable to transmit the marketing content directly to the individuals specified by the user.

In some embodiments, a recipient of marketing content (e.g., an individual in the user's personal network who receives an e-mail message or other marketing content inviting the individual to visit the user's customized online portal) may be provided with a mechanism or interface for referring others to the user's customized online portal. For example, in some embodiments the recipient may simply be allowed to forward the e-mail to friends, and a link to the user's customized online portal (and, for example, an accompanying password or other login credentials) may remain active upon the forwarding, such that the link (and any accompanying password or other login credentials) are not limited to use by the particular recipient(s) to whom they were sent. In other embodiments, however, a recipient may be provided with a mechanism or interface via which to refer additional individuals to the user but may not directly forward additional individuals to the user's customized online portal. For example, in the case of users who are minors and/or in circumstances in which privacy of the user is a concern, the User Fundraising Service may require that any referrals of additional individuals who may be interested in receiving an invitation to the user's customized online portal must be forwarded to the user for approval before being acted upon (e.g., before such invitations are forwarded to any of the additional individuals who were not directly identified by the user to receive such invitations). For example, assume a user transmits (or directs User Fundraising Service to transmit) an e-mail message (or a marketing content in another format, such as a tweet™) to individuals in his/her personal network, inviting them to visit the user's personalized online portal and make purchases or donations in support of the fundraising campaign the user is participating in. It may be assumed that some of the individuals who receive such an invitation may want to help the user by forwarding the invitation to their own friends or family. However, the user (or organization associated with the fundraising campaign) may have privacy concerns with such forwarding of individuals. The User Fundraising Service may, in some embodiments, allow the original recipients of such invitations to refer others back to the user, so that the user may decide whether to transmit invitations to any of the additional individuals so referred by the original recipient(s). In some embodiments, any invitations the user authorizes to be sent to such additional recipients referred by a particular original recipient may be automatically customized to indicate the original recipient who provided the referral (e.g., if the original recipient who referred an additional recipient is the user's uncle, named John Smith, the individual invitation may state: "My uncle, John Smith, suggested I let you know about our fundraising campaign. Would you like to buy?"). In one embodiment, an original recipient of an invitation or marketing treatment may provide one or more referrals to the user (i.e., additional individuals to whom the original recipient suggests the invitation should be sent) along with a respective at least one e-mail address or other contact data for each of the one or more referrals.

In 1212, the user's progress towards meeting the one or more specified goals determined in 1208 are tracked. It should be noted that this tracking may be done over an extended period of time (e.g., over days or weeks during a duration of the corresponding campaign). For example, as individuals invited by the user (e.g., via an e-mail or other marketing treatment) respond by clicking on a link in the marketing treatment which leads them to the user's online portal and make a contribution to the organization's campaign (e.g. by making a donation or purchasing a product via the online portal), an indication of each such contribution may be stored in association with the user and/or a record of the user's progress towards the goal(s) may be updated to reflect the progress responsive to such contribution. If the user is part of a group affiliated with the third party organization of the campaign, any contributions to the user's support of the campaign (e.g., any purchases made using the user's customized online portal) may also be attributed to, and stored in association with, the group. In some embodiments, a leader of the group may be informed of progress or contributions attributable to any member of the group (e.g., the leader may be provided by the User Fundraising Service with a group web page or reporting tool via which the leader may view the purchases or other contributions attributable to members of the group).

In accordance with some embodiments, a user may be rewarded (e.g., via virtual awards provided to the user's avatar or virtual location of the user's avatar) by satisfying certain benchmarks or performing certain activities aimed at improving the effectiveness (in terms of soliciting contributions from individuals via the user's online portal to benefit the campaign of the organization). For example, as described at least with respect to FIG. 7 and FIGS. 8A-8C, the user may be rewarded by (i) being provided with a certain virtual medal or trophy for uploading a video to his online portal and/or updating a blog or posting on the online portal; or (ii) having his avatar added to (or maintained in) a group image. In such embodiments, process 1200 may include step 1214, which comprises tracking a user's activities and/or content of the user's online portal to determine whether the benchmarks or activity goals have been satisfied by the user.

In step 1216, a user's avatar (e.g., an avatar's appearance, such as a medal or insignia on the avatar's uniform or other apparel) and/or a virtual location associated with the avatar may be updated based on the information tracked in 1212 and/or 1214. For example, if a user has met a financial goal of the fundraising or awareness campaign (e.g., at least X products have been sold to benefit the third party organization via the user's online portal), a virtual room may be updated to include a virtual trophy in a trophy case. In another example, if the user has uploaded a video to the online portal, the user's avatar may be modified such that the avatar's apparel now includes a badge or medal earned by the user.

It should be understood that tracking the user's progress towards one or more goals of the campaign and rewarding the user for meeting such goals, as well as tracking and rewarding the user for improving the effectiveness or content of an online portal, may be an effective mechanism for motivating the user to continue to exert efforts towards promoting the campaign on behalf of the organization. It should further be understood that rewards having real-world value (e.g, monetary value) or which are otherwise tangible in the off-line world may be used instead of or in addition to the virtual rewards described herein. For example, a user may earn items or monetary prizes which may be shipped or otherwise provided to the user.

As described herein, in some embodiments the User Fundraising Service may further facilitate financial aspects of the user's promotion of a fundraising campaign. For example, as described herein, the online portal may allow individuals invited by the user to make monetary donations and/or purchase products or services. In such embodiments, process 1200 or another process may include steps directed towards tracking, managing and facilitating such financial aspects. For example, the User Fundraising Service may be operable to (i) receive funds from an individual via a user's online portal (e.g., a monetary donation or a price paid for a product); (ii) charge an individual's credit, debit or other financial account; (iii) forward collected funds to a financial account of the user, the organization, a local chapter or sub-group of the organization, a fulfillment or shipping entity for providing the products to the individuals who ordered them; and (iv) store data indicative of such donations or orders completed via the online portals of users participating in the services of the User Fundraising Service.

In accordance with some embodiments, an individual who completes a transaction via a user's customized online portal which comprises a purchase of a physical product that is to be provided to the individual, the user may be provided with a choice as to how the user would prefer to obtain the product. For example, as described herein, in some embodiments the user may be allowed to request that the product be shipped to the user (in which case the user may provide shipping information and, in some embodiments provide a payment for the shipping). In other embodiments, the user may be allowed to elect to pick up the product at a location near the user. For example, in some embodiments the product may comprise a product offered for sale by a local merchant (e.g., local to a location of the individual purchasing the product) and an indication of the individual's purchase may be transmitted (e.g., by the User Fundraising Service) to the local merchant so that the individual may pick up the product at his/her convenience. In one embodiment, the individual may (in addition or alternately to the indication of the purchase being transmitted to the local merchant) be provided with an identifier (e.g., in the form of a voucher, coupon, barcode or otherwise), which when presented at the local merchant authorizes the individual to take possession of the appropriate product. In one embodiment, the third-party organization associated with the campaign in support of which the product is being purchased may operate a local place of business (which may or may not normally be operable to sell or provide the product(s) being offered for sale via the user's customized online portal). In such an embodiment, an individual who purchases the product via the user's customized online portal may be allowed to select such a local place of business of the organization as the preferred location for picking up or taking possession of the product. Thus, in some embodiments, local places of business of the organization may be re-purposed for allowing purchasers of products purchased in support of the organization's fundraising campaign to have the products shipped to the local places of business and picked up by the purchasers.

Figure 13:
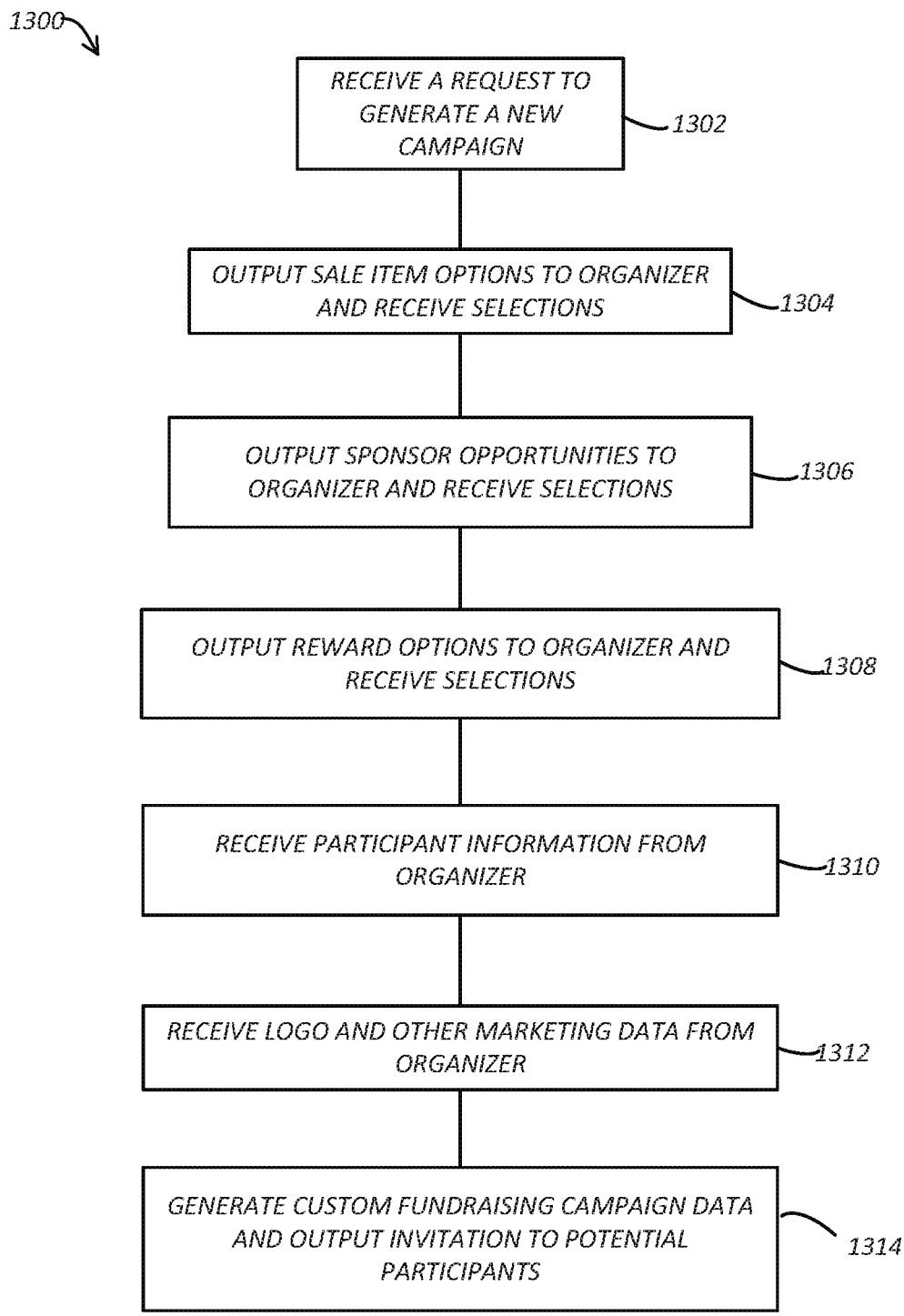
FIG. 13 is a flowchart of an example process consistent with one or more embodiments described herein.

Referring now to FIG. 13, illustrated therein is flowchart of an example process 1300 that is consistent with some embodiments. Process 1300 illustrates one proves via which a campaign organizer (e.g., a representative of a school group or team, a scout troop, a sports team or other organization in need of fundraising) can create a customized fundraising campaign using resources provided by the Fundraising Server 110. The process 1300 is initiated upon a request to generate a new fundraising campaign being received (1302). In some embodiments, an organizer who has previously created a fundraising campaign using Fundraising Server 110 may enter his previously established account credentials and thereby access data previously provided by the organizer (e.g., logos or other marketing data previously provided by the organizer for use in campaigns to benefit the third party organization; bank account information identifying an account to which proceeds from a fundraising campaign should be transmitted; information on a pool of potential participants, etc.).

In order to generate a new campaign (e.g., process and store data relevant to the campaign, to be provided to participants who want to participate in the campaign), the Fundraising Server 110 collects certain data from an organizer of the campaign. In accordance with some embodiments, such data is collected by outputting to the organizer a menu of choices in various categories and allowing the organizer to make selections. In some embodiments, the User Fundraising Service described herein (or employees thereof) perform the preliminary work of obtaining various available choices for campaigns, such as a wide variety of items that can be sold by participants of the campaign so that a campaign organizer need not go to different companies to initiate fundraising campaigns (e.g., a first company if the organizer wants to sell magazines during the campaign, a second company if the organizer wants to sell wrapping paper during the campaign, a third company if the organizer wants to sell plants during the campaign, etc.). The User Fundraising Service described herein is operable, in some embodiments, to sign contracts or agreements with a wide variety of companies that offer a wide variety of items for sale and thus allow campaign organizers many different choices for what to sell during a campaign without needing to deal with a different company each time the organizer decides to sell a different product as part of a fundraising campaign. Thus, for example, in step 1304 the various sale item options may be output to the organizer and selections of the organizer received. In accordance with some embodiments, a campaign organizer can mix and match items from different source companies when creating a campaign, thus providing further flexibility and sales opportunities to the campaign.

Various sponsor options for the campaign may also be output to the organizer and the organizer's selections received (1306). As described herein, in some embodiments a company may be interested in serving as a sponsor for fundraising campaigns (e.g., by donating to the campaign or providing rewards to participants who satisfy sales goals of the campaign) in exchange for having its logo(s) or brand(s) used in the campaign (e.g., on apparel worn by a user's avatar, as part of an emoji a user uses in his/her marketing messages promoting the campaign, in the virtual room of a user's avatar, etc.). As with items available for sale during a campaign, in some embodiments a User Fundraising Service may do the necessary background work to enter agreements with various sponsors (including agreeing to the terms by which a campaign must abide by when selecting a particular sponsor for their campaign) so that a campaign organizer need only pick an available sponsor from a menu of available sponsors rather than having to negotiate and enter a sponsorship agreement with a sponsor company.

The campaign organizer then selects the one or more rewards that may be made available to participants who participate in a campaign (users who sell items during the campaign for the benefit of the third party organization with which the campaign organizer is affiliated; 1308). In some embodiments, the available rewards that a campaign organizer may be able to choose from may be based at least in part on at least one of the items the organizer has selected to have sold during the campaign (1304) or the sponsor (if any) that the organizer selected for the campaign (1306). As with the items available for sale and the sponsor opportunities, the User Fundraising Service may have entered into various agreements with a wide variety of companies that provide items that may be offered as rewards to campaign participants, to allow for a wide variety of choices to offer to a campaign organizer. In some embodiments, as described herein, rewards may not be tangible items but may rather by virtual rewards (e.g., virtual trophies to be added to a virtual room of a user's avatar, virtual patches to be added to a user's avatar, a user's avatar being added to a virtual group image, etc.). A menu of reward options may be output to the campaign organizer and the campaign organizer can select one or more of these options.

In step 1310, data regarding potential or qualified participants for the campaign is received. This data may be entered by the campaign organizer for the first time or retrieved from a memory based on previous campaigns the campaign organizer has created using the User Fundraising Service. For example, criteria defining a qualified user may be entered or otherwise retrieved (e.g., a qualified user must be a registered member of the troop comprising the third party organization, must provide a qualifying password, etc.). In another example, names and/or contact information defining qualified potential participants may be entered or retrieved.

Finally, in step 1312, marketing data of the third party organization may be received or retrieved from memory based on one or more previous campaigns the organizer has created. For example, logos, graphics or other files representing the third party organization (for use in marketing communication to be created by participants of the campaign) may be uploaded or retrieved.

In step 1314, the campaign is generated and an invitation is created for potential participants. For example, a record for the campaign is completed and stored (e.g., under a unique campaign identifier) such that the selections made by the campaign organizer and the marketing content provided by the campaign organizer are stored and made available for users who participate in the campaign. For example, the data may be used to output menu choices to users who participate in the campaign and are creating their customized online portal and/or customized avatar, for tracking whether a user has earned a reward, for determining whether a user's avatar should be updated (e.g., to show a badge or patch or other virtual reward), for determining whether a virtual room of a particular avatar should be updated (e.g., to show a virtual trophy or add/fade an avatar from a group image) and to communicate information about progress in the campaign to the campaign organizer. The invitation to participate in the campaign may be sent directly to potential participants by the system (e.g., e-mails may be sent to e-mail addresses provided by the organizer) or a custom link or URL may be output to the organizer, who may then in turn use the link to communicate the campaign to potential participants.

It should be understood that the above are merely examples of embodiments and should not be interpreted in a limiting fashion. Modifications and alterations to one or more methods described herein could be made without departing from the spirit and scope of the present invention. For example, while embodiments described herein have references a "volunteer" workforce, it should be noted that none of the embodiments require that the user on whose behalf an online portal and/or avatar is customized is a volunteer of the organization for which the user is participating in a fundraising or awareness campaign. In another example, in some embodiments, a user may comprise a minor. In such embodiments, a parent or guardian of the user may be involved in helping the user provide content or information for use in customizing an avatar of the user and a customized online portal of the user. In another embodiment, the fundraising service and/or the User Fundraising Service may be operable to support or facilitate additional functionality for helping a user promote a fundraising or awareness campaign of an organization. For example, the User Fundraising Service may be operable to facilitate a user in scheduling and/or hosting a webinar for individuals within their personal network, in which webinar the user may have an opportunity to "pitch" them on participating in the organization's fundraiser. In particular, such embodiments may include functionality which the User Fundraising Service may provide a user with tools for (i) scheduling a webinar and invite friends and family (through an email upload) to participate during a specific time and date via an email; (ii) hosting a webinar and present a compelling pitch using suggested scripted language; (iii) upon a completion of a webinar, generating an e-mail to all participants of the webinar with a link to the user's online portal; and (iv) referencing in such an e-mail the webinar and specific goals mentioned during the webinar. In some embodiments, a user may be provided with an opportunity to include a recording of such a webinar (or portion of it) as a video or audio file posted in their online portal. In another example, a user's avatar may be utilized in other mediums other than e-mails, other marketing content for a fundraising campaign or in a customized online portal for promoting a fundraising campaign. For example, the User Fundraising Service may be operable to transfer or allow access to a user's avatar (e.g., with the user's permission) for use in mobile apps or games that are compatible with use of the avatar.

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or sub-component from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A method for generating customized online stores for facilitating fundraising efforts of a user on behalf of an organization, comprising:
receiving, by an online portal generating controller comprising at least one processor and operable to communicate with a plurality of user devices and from a first user device of a first user, a first request to generate a first customized online store that features a customized avatar of the first user and comprises a plurality of web pages, each of the plurality of web pages being customized by the online portal generating controller for the first user;
receiving, by the online portal generating controller and from a second user device of a second user, a second request to generate a second customized online store that features a customized avatar of the second user and comprises a plurality of web pages, each of the plurality of web pages being customized by the online portal generating controller for the second user;
receiving, over a network and from the first user device of the first user, first data for customizing each of the first customized online store and the customized avatar of the first user, the first customized online store being for selling at least one product to at least one recipient associated with at least the first user,
wherein a purchase of the at least one product is for a benefit to the organization;
receiving, over the network and from the second user device of the second user, second data for customizing each of the second customized online store and the avatar of the second user, the second customized online store being for selling the at least one product to at least one recipient associated with at least the second user;
generating the customized avatar of the first user using (i) the first data received from the first user device; and (ii) proprietary marketing content indicating the organization;
generating the customized avatar of the second user using (ii) the second data received from the second user device; and (ii) the proprietary marketing content indicating the organization;
generating for the first user a first customized online store comprising a first plurality of web pages by using the first data received from the first user device, the generating including placing the customized avatar of the first user into the first customized online store, wherein the first customized online store includes purchasing functionality on at least one of the first plurality of web page and includes the customized avatar of the first user throughout more than one of the first plurality of web pages;
generating for the second user a second customized online store comprising a second plurality of web pages by using the second data received from the second user device, the generating including placing the customized avatar of the second user into the second customized online store, wherein the second customized online store includes purchasing functionality on at least one of the second plurality of web pages and includes the customized avatar of the second user throughout more than one of the second plurality of web pages;
generating a first unique URL that serves as an online address to the first customized online store;
generating a second unique URL that serves as an online address to the second customized online store;
selling, through the first customized online store, a first item to the at least one recipient associated with the first user; and
selling, through the second customized online store, the first item to the at least one recipient associated with the second user.

2. The method of claim 1, further comprising:
utilizing the proprietary marketing content indicating the organization when generating the first customized online store and when generating the second customized online store.

3. The method of claim 1, further comprising:
generating a first e-mail message to be transmitted to the at least one recipient associated with the first user, the first e-mail message including an image of the customized avatar of the first user; and
generating a second e-mail message to be transmitted to the at least one recipient associated with the second user, the second e-mail message including an image of the customized avatar of the second user.

4. The method of claim 3, wherein the method further comprises:
determining that the at least one recipient associated with the first user has made a purchase of the at least one product via the first customized online store; and crediting the purchase towards a goal associated with the first user.

5. The method of claim 4, further comprising:
updating, based on at least the purchase, a stored indication of virtual awards earned by the first user; and
updating a visual representation of the virtual awards earned by the first user, which virtual representation is viewable online by at least the first user.

6. The method of claim 5, wherein the virtual representation comprises a uniform worn by the customized avatar of the first user, such that updating the visual representation of the virtual awards earned by the first user comprises at least one of adding and modifying a representation of at least one virtual award on the uniform.

7. The method of claim 5, wherein the virtual representation comprises a graphic representation of a virtual location associated with the customized avatar of the first user, such that updating the virtual representation of the virtual awards earned by the first user comprises at least one of adding and modifying a representation of a virtual award in the virtual location.

8. The method of claim 7, wherein the virtual location comprises a virtual room in which the customized avatar of the first user is depicted.

9. The method of claim 5, further comprising:
generating for a customized online portal associated with the first customized online store and the first user, using at least the first data received from the first user device:
a representation of a virtual room for the customized avatar of the first user; and
a virtual photo for output in the virtual room, the virtual photo including a representation of at least the customized avatar of the first user.

10. The method of claim 9, further comprising:
modifying the virtual photo to include a representation of the customized avatar of the second user.

11. The method of claim 5, wherein a visual status of the customized avatar of the second user within the group photo is based on a progress of the second user towards satisfying at least one predetermined criteria for supporting the organization.

12. The method of claim 1,
wherein the first data further comprises at least one of a message typed in by the first user, a video uploaded by the first user, an image uploaded by the first user and a financial goal set by the first user; and
wherein the second data further comprises at least one of a message typed in by the second user, a video uploaded by the second user, an image uploaded by the second user and a financial goal set by the second user.

13. The method of claim 1, wherein the proprietary marketing content comprises at least one of a logo owned by the organization, a uniform worn by members of the organization, a trademark owned by the organization and membership information of the organization.

14. The method of claim 1, wherein the processor is further operable to;
facilitate a design of physical merchandise bearing a representation of at least one of the customized avatar of the first user and the customized avatar of the second user; and
output to at least one of the first user and the second user an opportunity to purchase such physical merchandise.

15. A system for generating customized online stores for facilitating fundraising efforts of a user to support an organization, comprising:

a processor of an online portal generating controller, wherein the online portal generating controller is in communication with a plurality of user devices;
a memory storing a program for directing the processor of the online portal generating controller, the processor being operable with the program to:
receive from a first user a first request to generate a first customized online store that features a customized avatar of the first user and comprises a plurality of web pages, each of the plurality of web pages being customized by the online portal generating controller for the first user;
receive from a second user a second request to generate a second customized online store that features a customized avatar of the second user and comprises a plurality of web pages, each of the plurality of web pages being customized by the online portal generating controller for the second user;
receive, over a network and from a first user device of the first user, first data for customizing each of the first customized online store and the customized avatar of the first user, the first customized online store being for selling at least one product to at least one recipient associated with at least the first user, wherein a purchase of the at least one product is for a benefit to the organization;
receive, over the network and from a second user device of the second user, second data for customizing each of the second customized online store and the customized avatar of the second user, the second customized online store being for selling the at least one product to at least one recipient associated with at least the second user;
generate the customized avatar of the first user using (i) the first data received from the first user device; and (ii) proprietary marketing content indicating the organization;
generate the customized avatar of the second user using (i) the second data received from the second user device; and (ii) the proprietary marketing content indicating the organization;
generate for the first user a first customized online store comprising a first plurality of web pages by using the first data received from the first user device, the generating including placing the customized avatar of the first user into the first customized online store, wherein the first customized online store includes purchasing functionality on at least one of the first plurality of web page and includes the customized avatar of the first user throughout more than one of the first plurality of web pages;
generate for the second user a second customized online store comprising a second plurality of web pages by using the second data received from the second user device, the generating including placing the customized avatar of the second user into the second customized online store, wherein the second customized online store includes purchasing functionality on at least one of the second plurality of web pages and includes the customized avatar of the second user throughout more than one of the second plurality of web pages;
generate a first unique URL that serves as an online address to the first customized online store;
generate a second unique URL that serves as an online address to the second customized online store;

sell, through the first customized online store, a first item to the at least one recipient associated with the first user; and sell, through the second customized online store, the first item to the at least one recipient associated with the second user.

16. The system of claim 15, wherein the processor is further operable with the program to:

utilize the proprietary marketing content indicating the organization when generating the first customized online store and when generating the second customized online store.

17. The system of claim 15, wherein the processor is further operable with the program to generate for a first customized online portal associated with the first customized online store and the first user, using at least the first data received from the first user device:

a representation of a virtual room for the customized avatar of the first user; and a virtual photo for output in the virtual room, the virtual photo including a representation of at least the customized avatar of the first user.

18. The system of claim 15, wherein the processor is further operable with the program to:

modify the virtual photo to include a representation of the customized avatar of the second user.

19. The system of claim 18, wherein the processor is further operable with the program to:

modify a visual status of the customized avatar of the second user within the group photo based on a progress of the second user towards satisfying at least one predetermined criteria for supporting the organization.

20. A non-transitory computer-readable medium storing instructions for directing a processor to generate customized online stores to facilitate fundraising efforts of a user to support an organization, the instructions when executed by the processor causing the processor to:

receive, by an online portal generating controller comprising at least one processor and operable to communicate with a plurality of user devices and from a first user device of a first user, a first request to generate a first customized online store that features a customized avatar of the first user and comprises a plurality of web pages, each of the plurality of web pages being customized by the online portal generating controller for the first user;

receive, by the online portal generating controller and from a second user device of a second user, a second request to generate a second customized online store that features a customized avatar of the second user and comprises a plurality of web pages, each of the plurality of web pages being customized by the online portal generating controller for the second user;

receive, over a network and from the first user device of the first user, first data for customizing each of the first customized online store and the customized avatar of the first user, the first customized online store being for selling at least one product to at least one recipient associated with at least the first user, wherein a purchase of the at least one product is for a benefit to the organization;

receive, over the network and from the second user device of the second user, second data for customizing each of the second customized online store and the customized avatar of the second user, the second customized online store being for selling the at least one product to at least one recipient associated with at least the second user;

generate the customized avatar of the first user using (i) the first data received from the first user device, and (ii) proprietary marketing content indicating the organization;

generate the customized avatar of the second user using (i) the second data received from the second user device, and (ii) the proprietary marketing content indicating the organization;

generate for the first user a first customized online store comprising a first plurality of web pages by using the first data received from the first user device, the generating including placing the customized avatar of the first user into the first customized online store, wherein the first customized online store includes purchasing functionality on at least one of the first plurality of web page and includes the customized avatar of the first user throughout more than one of the first plurality of web pages;

generate for the second user a second customized online store comprising a second plurality of web pages by using the second data received from the second user device, the generating including placing the customized avatar of the second user into the second customized online store, wherein the second customized online store includes purchasing functionality on at least one of the second plurality of web pages and includes the customized avatar of the second user throughout more than one of the second plurality of web pages;

generate a first unique URL that serves as an online address to the first customized online store;

generate a second unique URL that serves as an online address to the second customized online store;

sell, through the first customized online store, a first item to the at least one recipient associated with the first user; and sell, through the second customized online store, the first item to the at least one recipient associated with the second user.

21. The non-transitory computer-readable medium of claim 20, the instructions further causing the processor to:

utilize the proprietary marketing content indicating the organization when generating the first customized online store and when generating the second customized online store.

22. The non-transitory computer-readable medium of claim 20, the instructions further causing the processor to generate for a first customized online portal associated with the first customized online store and the first user, using at least the first data received from the first user device:

a representation of a virtual room for the customized avatar of the first user; and a virtual photo for output in the virtual room, the virtual photo including a representation of at least the customized avatar of the first user.

23. The non-transitory computer-readable medium of claim 22, the instructions further causing the processor to:

utilize the proprietary marketing content indicating the organization to generate at least one of the representation of the virtual room and the virtual photo.

24. The non-transitory computer-readable medium of claim 22, the instructions further causing the processor to:

modify the virtual photo to include a representation of the customized avatar of the second user.

25. The non-transitory computer-readable medium of claim 24, the instructions further causing the processor to:
modify a visual status of the customized avatar of the second user within the group photo based on a progress of the at least one second user towards satisfying at least one predetermined criteria for supporting the organization.

* * * * *